(12) United States Patent
Akahane

(10) Patent No.: US 7,916,737 B2
(45) Date of Patent: Mar. 29, 2011

(54) RELAYING DEVICE, NETWORK SYSTEM, AND NETWORK SYSTEM CONTROLLING METHOD

(75) Inventor: Shinichi Akahane, Hachioji (JP)

(73) Assignee: Alaxala Networks Corporation, Kanagawa (JP)

(*) Notice: Subject to any disclaimer, the term of this patent is extended or adjusted under 35 U.S.C. 154(b) by 300 days.

(21) Appl. No.: 12/323,637

(22) Filed: Nov. 26, 2008

(65) Prior Publication Data
US 2009/0190600 A1    Jul. 30, 2009

(30) Foreign Application Priority Data

Jan. 25, 2008  (JP) .................................. 2008-014631

(51) Int. Cl.
*H04L 12/28* (2006.01)
*H04L 12/56* (2006.01)

(52) U.S. Cl. ... 370/400; 370/260; 370/389; 370/395.42; 370/466; 455/572; 710/305

(58) Field of Classification Search .................. 370/260, 370/389, 392, 395.42, 400, 466; 455/572; 710/305

See application file for complete search history.

(56) References Cited

U.S. PATENT DOCUMENTS

| | | | |
|---|---|---|---|
| 2005/0136989 A1* | 6/2005 | Dove | 455/572 |
| 2005/0169257 A1* | 8/2005 | Lahetkangas et al. | 370/389 |
| 2005/0243861 A1* | 11/2005 | Elkayam et al. | 370/466 |
| 2006/0133368 A1* | 6/2006 | Tolliver | 370/389 |
| 2006/0277346 A1* | 12/2006 | Doak et al. | 710/305 |
| 2008/0294917 A1* | 11/2008 | Khan et al. | 713/310 |

FOREIGN PATENT DOCUMENTS

| | | |
|---|---|---|
| JP | 2000-201166 | 7/2000 |
| JP | 2005-123715 | 5/2005 |
| JP | 2007-228490 | 9/2007 |
| JP | 2007-228491 | 9/2007 |

* cited by examiner

*Primary Examiner* — Pankaj Kumar
*Assistant Examiner* — Lonnie Sweet
(74) *Attorney, Agent, or Firm* — Antonelli, Terry, Stout & Kraus, LLP.

(57) ABSTRACT

The first relaying device uses the first port (the second relaying device) for the first priority in the first selecting mode, and uses a port other than the second port (the third relaying device) for the second priority. The first relaying device uses the first port for the first priority and uses the second port for the second priority, in the second selecting mode. In a case where the selecting mode is the first selecting mode, the power mode of the third relaying device is the first power mode wherein the power consumption is relatively small. In a case where the selecting mode is the second selecting mode, the power mode of the third relaying device is the second power mode wherein the power consumption is relatively high.

15 Claims, 18 Drawing Sheets

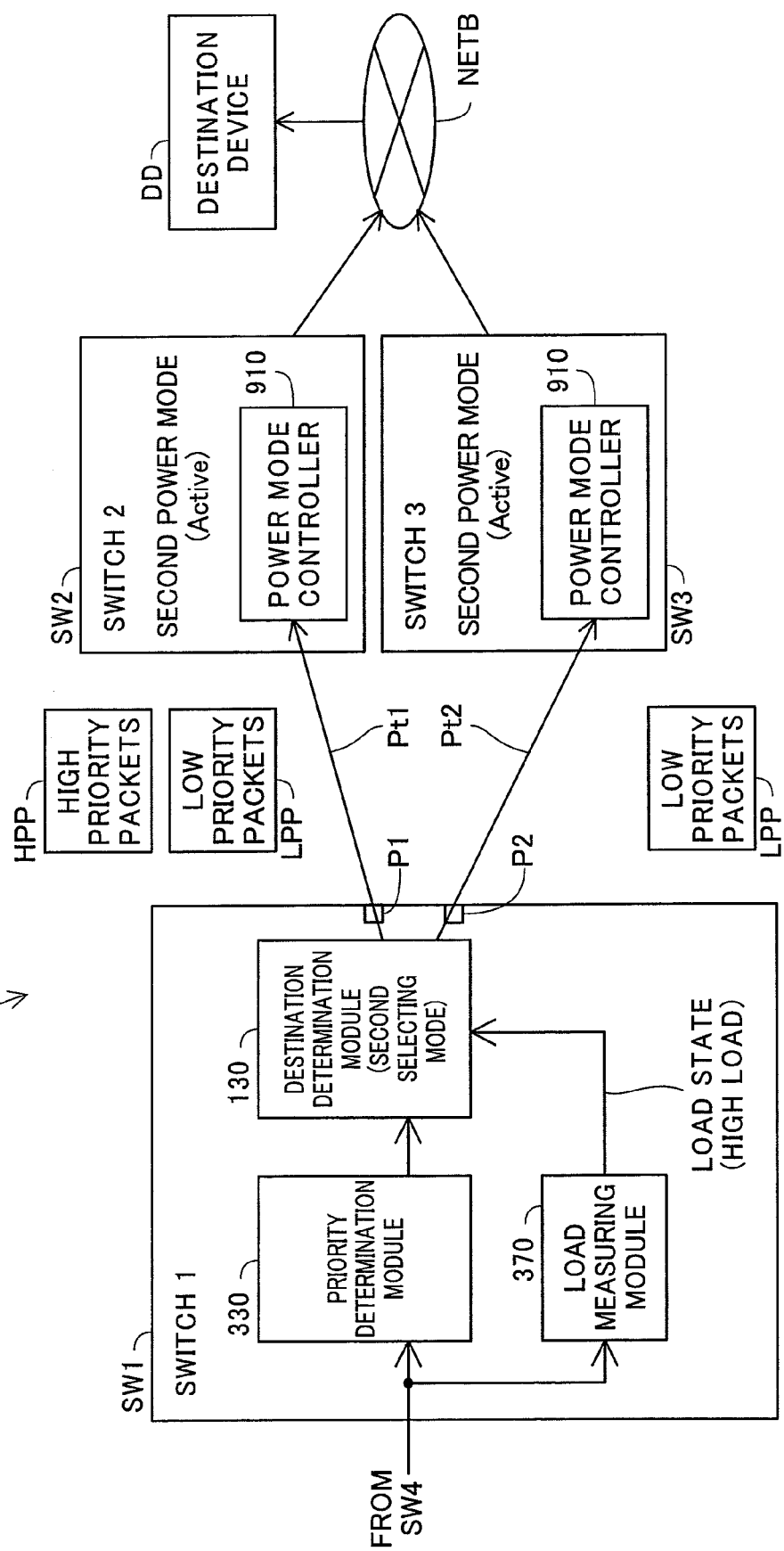

PACKET STRUCTURE

LAYER 2 HEADER (UNTAGGED)

LAYER 2 HEADER (TAGGED)

LAYER 3 HEADER (IPv4)

LAYER 3 HEADER (IPv6)

LAYERED 4 HEADER (TCP)

LAYER 4 HEADER (UDP)

Fig.5

PRIORITY TABLE 334

| | CONDITION | | | | | PROCESSING PRIORITY |
|---|---|---|---|---|---|---|
| | L2 HEADER INFORMATION | | L3 HEADER INFORMATION | | L4 HEADER INFORMATION | |
| VLAN ID | URPI | OTHER | TOS | OTHER | | |
| VLAN1 | 0 | * | 0 | * | * | PRI_0 (LOW) |
| VLAN1 | 2 | * | 2 | * | * | PRI_1 (HIGH) |
| VLAN2 | * | * | * | * | * | PRI_1 (HIGH) |
| ... | ... | ... | ... | ... | ... | ... |

RECEPTION STATISTICAL INFORMATION TABLE 232R

| RECEPTION PORT | PROCESSING PRIORITY | TRANSMISSION STATISTICAL INFORMATION | | | NUMBER OF PACKETS /SEC | NUMBER OF BYTES /SEC | UPPER LIMIT THRESHOLD VALUE | LOWER LIMIT THRESHOLD VALUES |
|---|---|---|---|---|---|---|---|---|
| | | CUMULATIVE NUMBER OF PACKETS | CUMULATIVE NUMBER OF BYTES | PREVIOUS ARRIVAL TIME | | | | |
| P1 | PRI_0(LOW) | 500,000,000 | 60,000,000,000 B | 10sec | 100 packets/sec | 10000 B/sec | R1TU_0 | R1TL_0 |
| | PRI_1(HIGH) | 1,100,000,000 | 120,000,000,000 B | 11sec | 1000 packets/sec | 100000 B/sec | R1TU_1 | R1TL_1 |
| | PRI_0+PRI_1 (LOW + HIGH) | 1,600,000,000 | 180,000,000,000 B | 10sec | 1100 packets/sec | 110000 B/sec | R1TU_e | R1TL_e |
| P2 | PRI_0(LOW) | 100,000,000 | 11,000,000,000 B | 7890 sec | 0 packets/sec | 0 B/sec | R2TU_0 | R2TL_0 |
| | PRI_1(HIGH) | 110,000,000 | 10,000,000,000 B | 7992 sec | 0 packets/sec | 0 B/sec | R2TU_1 | R2TL_1 |
| | PRI_0+PRI_1 (LOW + HIGH) | 210,000,000 | 21,000,000,000 B | 7890 sec | 0 packets/sec | 0 B/sec | R2TU_e | R2TL_e |
| ... | ... | | | | ... | ... | ... | ... |

RLD0, RLD1, RLDe

Fig.8

DESTINATION TABLE 132

| DESTINATION ADDRESS | PROCESSING PRIORITY | OUTPUT PORT LIST | |
|---|---|---|---|
| | | LOW LOAD | ADDITION FOR HIGH LOAD |
| DA1 | RPI_0 (LOW) | P1 | P2 |
| DA1 | RPI_1 (HIGH) | P1 | — |
| DA2 | RPI_0 (LOW) | P1 | P2 |
| DA2 | RPI_1 (HIGH) | P1 | — |
| ... | ... | ... | ... |

DR1 → (row 1)
DR2 → (row 2)

Fig.9

CONTROL INFORMATION TABLE 122

LPQ ↓        HPQ ↓

| PROCESSING PRIORITY : LOW | PROCESSING PRIORITY : HIGH |
|---|---|
| HEADER a (PACKET a) | HEADER c (PACKET c) |
| HEADER b (PACKET b) | HEADER d (PACKET d) |
| HEADER e (PACKET e) | — |
| — | — |
| ∘ ∘ ∘ | ∘ ∘ ∘ |

FIRST POWER MODE (LOW LOAD, POWER SAVING)

SECOND POWER MODE (HIGH LOAD)

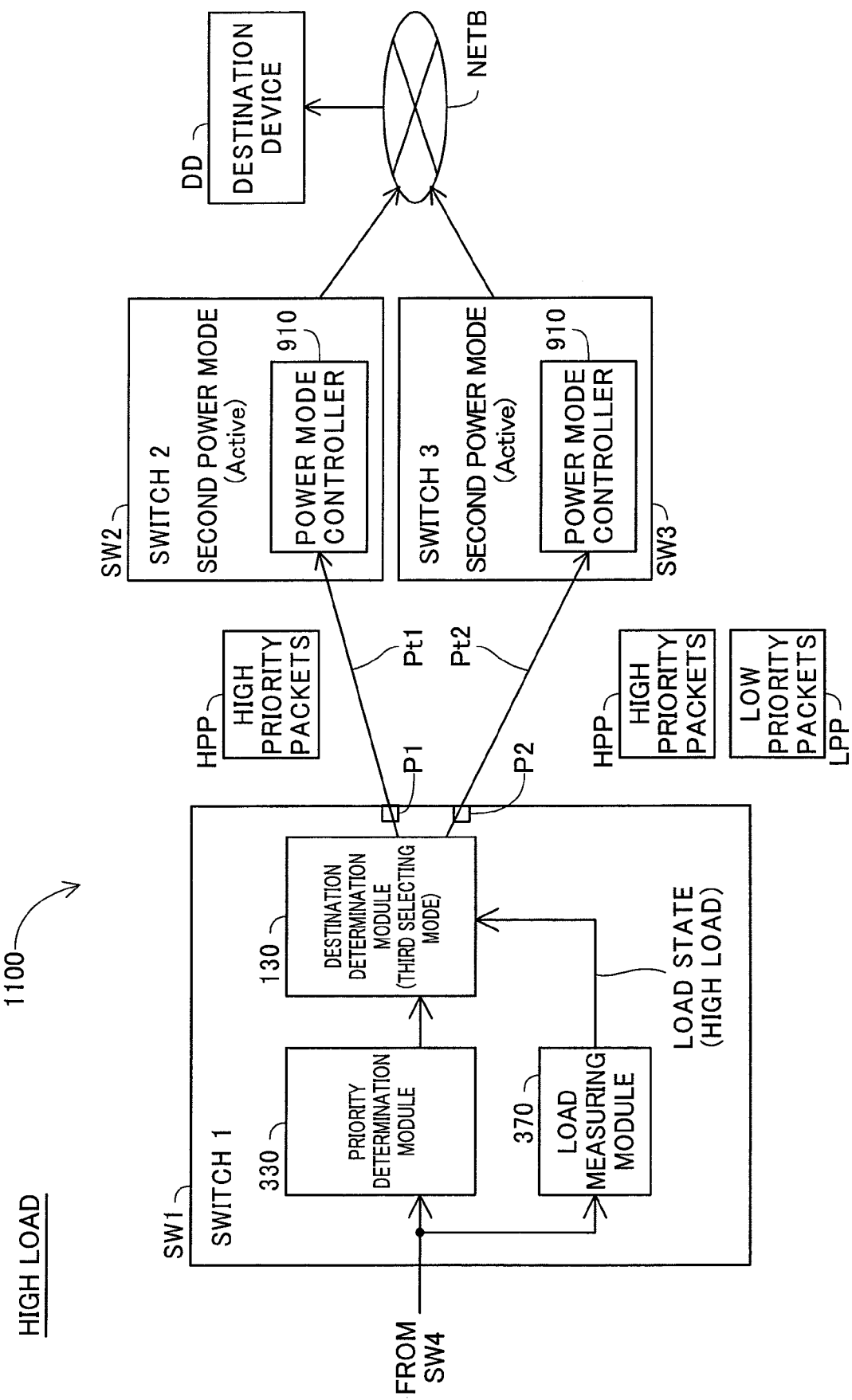

RELAYING DEVICE, NETWORK SYSTEM, AND NETWORK SYSTEM CONTROLLING METHOD

CROSS-REFERENCE TO RELATED APPLICATIONS

The present application claims the priority based on Japanese Patent Application No. 2008-14631 filed on Jan. 25, 2008, the disclosure of which is hereby incorporated by reference in its entirety.

BACKGROUND

1. Technical Field

The present invention relates to a relaying device, a network system, and a network system controlling method.

2. Description of the Related Art

Networks including relaying devices such as switches and routers have been used. Recent years have seen remarkable improvements in performance in relaying devices in order to handle networks of larger sizes and in order to handle increases in data transmission amounts through networks. There has been a tendency for the power consumed by the relaying devices to increase in accordance with the improved performance. On the other hand, among devices that are connected to networks, there are known devices that can operate in normal operating modes and power saving modes.

SUMMARY

Concerning devices operable in a plurality of power modes with different power consumption levels, the performance in the power mode with low power consumption will be less than the performance in the power mode with high power consumption. Often the reduction in performance in the relaying device has led to a reduction in the reliability of the data relay. Note that there has been inadequate innovation in regards to controlling both the reliability of the data relay and the power consumption.

An advantage of some aspects of the invention is to provide a technology capable of controlling both the reliability of the data relay and the power consumption.

According to a first aspect of the invention, there is provided a network system. The network system includes a first, a second, and a third relaying devices that relay packets. The first relaying device includes N (the number N is an integer at least 2) ports configured to connect to lines. The N ports include a first port and a second port. The first port is connected to a line from the second relaying device. The second port is connected to a line from the third relaying device.

Among the N ports, J (the number J is an integer at least 2 and at most N) candidate ports are capable of communication with a specific common destination. The J candidate ports include the first port and the second port.

The first relaying device further includes a priority determination module and a packet processor. The priority determination module determines a priority of a received packet from among K (the number K is an integer at least 2) priority levels including a first priority and a second priority. The packet processor determines, for each target packet, an output port to be used for sending the target packet from among the J candidate ports in accordance with the priority. The target packet is a received packet destined for the specific destination.

The third relaying device includes a power mode controller that controls a power mode of the third relaying device. The power mode controller selects the power mode from among a plurality of power modes including a first power mode and a second power mode. The power consumption of the third relaying device is relatively small in the first power mode. The power consumption is relatively large in the second power mode.

The packet processor has a first selecting mode and a second selecting mode for selecting the output port. The first selecting mode relates to a case where the power mode of the third relaying device is the first power mode. The second selecting mode relates to a case where the power mode of the third relaying device is the second power mode.

In the first selecting mode, the packet processor:
selects, from at least one candidate port including the first port, an output port to be used for a received packet of the first priority; and
selects, from at least one candidate port excluding the second port, an output port to be used for a received packet of the second priority.

In the second selecting mode, the packet processor:
selects, from at least one candidate port including the first port, an output port to be used for a received packet of the first priority; and
selects, from at least one candidate port including the second port, an output port to be used for a received packet of the second priority.

This arrangement enables the use of the first power mode and the second power mode with different levels of power consumption, as power modes of the third relaying device, thereby enabling control of the power consumption.

Furthermore, communication paths are used in the first and the second selecting modes in the first relaying device as described below. That is, for the first priority, the route through the second relaying device connected to the first port may be used regardless of the selecting mode. For the second priority, the route through the third relaying device whose power mode is changeable may be used selectively. As a result, priority can be given to the reliability of the relay of the packets with the first priority over the reliability of the relay of the packets with the second priority.

Accordingly, both the reliability of the data relay and the power consumption can be controlled.

Note that the invention can be embodied in a variety of forms. For example, the invention can be embodied as a packet relaying method and device, a computer program for achieving the functions of this method and device, a recording medium upon which the computer program is recorded, or the like.

These and other objects, features, aspects, and advantages of the present invention will become more apparent from the following detailed description of the preferred embodiments with the accompanying drawings.

BRIEF DESCRIPTION OF THE DRAWINGS

FIG. 3 is a schematic diagram illustrating an operating state of the network system 1100.

FIG. 5 is an explanatory diagram of a priority table 334.

FIG. 7 is an explanatory diagram of a reception statistical information table 332R.

FIG. 8 is an explanatory diagram of a destination table 132.

FIG. 9 is an explanatory diagram of a control information table 122.

FIG. 19 is a schematic diagram of a third selecting mode.

DESCRIPTION OF THE PREFERRED EMBODIMENT

Embodiments according to the invention will be explained below based on embodiments in the following sequence:
A. First Embodiment;
B. Second Embodiment;
C. Third Embodiment;
D. Fourth Embodiment;
E. Fifth Embodiment; and
F. Modified Embodiments.

A. First Embodiment

Figure 1:
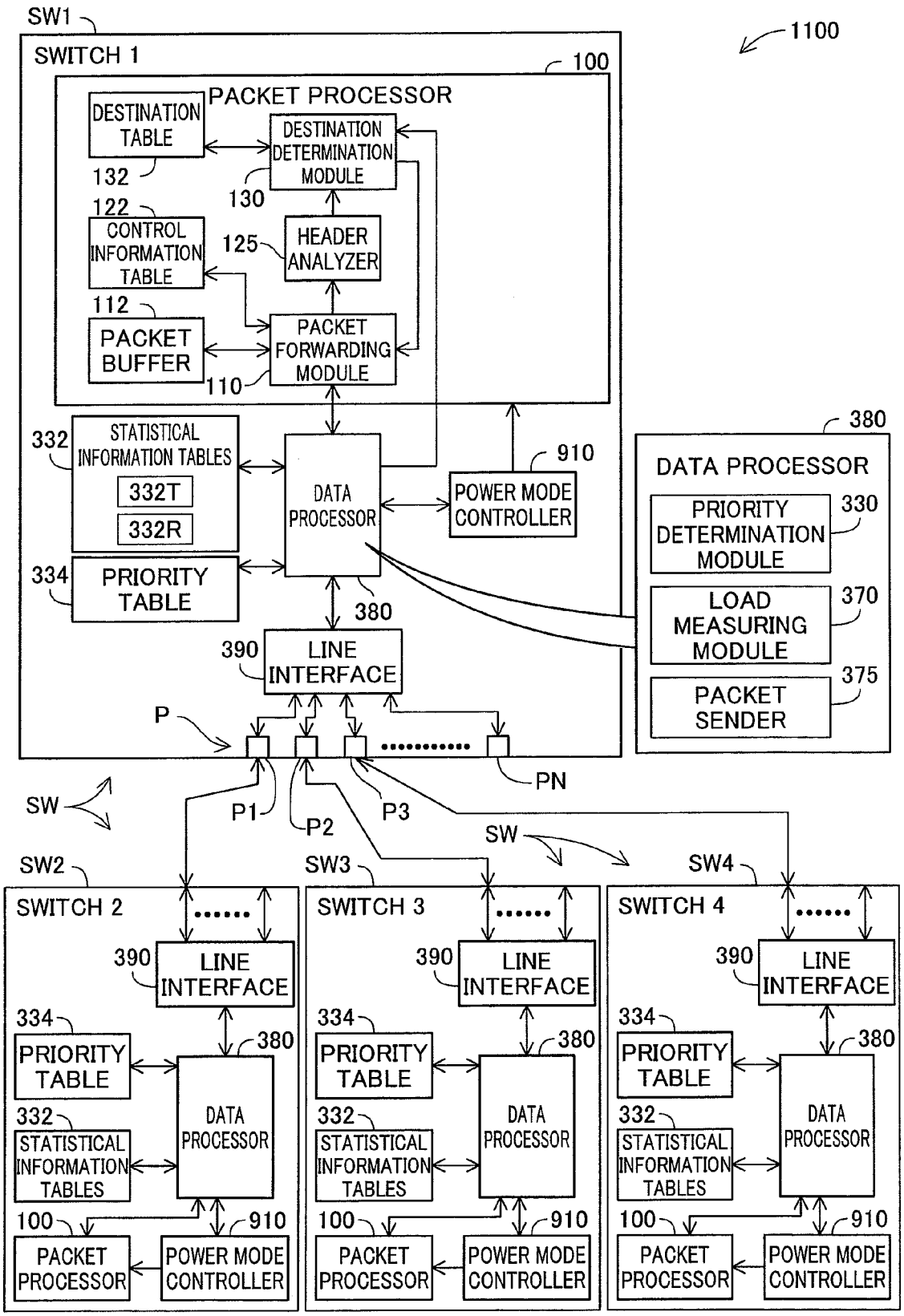
FIG. 1 is an explanatory diagram illustrating a network system 1100 as an embodiment.

FIG. 1 is an explanatory diagram illustrating a network system 1100 as one embodiment according to the invention. This network system 1100 has four switching devices SW1, SW2, SW3, and SW4. In the embodiment, each switching device SW1, SW2, SW3, and SW4 functions as a so-called "layer 3 switch." Layer 3 corresponds to the third layer (the network layer) in the so-called OSI (Open System Interconnection) reference model.

The configuration of the first switching device SW1 is illustrated in FIG. 1. The first switching device SW1 has a packet processor 100, a data processor 380, a line interface 390, a statistical information table 332, a priority table 334, a power mode controller 910, and N (where N is an integer at least 2) physical ports P. The statistical information table 332 includes a transmission statistical information table 332T and a reception statistical information table 332R. Each of these tables 332 and 334 is stored in a memory (not shown). These elements in the first switching device SW1 are configured by hardware circuitry (for example, circuitry such as an ASIC (Application Specific Integrated Circuit) may be used).

The physical port P is a physical interface for connecting a line, such as a coaxial cable or an optical fiber (for example, the physical port is based on the Ethernet (registered trademark) standard). In the embodiment, the N physical ports P are identified by unique port numbers (1 through N). In FIG. 1, a combination of "P" and the port number is assigned to each individual physical port P as the reference character.

The line interface 390 receives packets through analyzing the electrical signals received through the physical port P. Additionally, the line interface 390 provides the packets to the data processor 380. The packet is a data transmission unit. Packets are configured in accordance with a variety of protocols. For example, the packet configured according to the second layer (data link layer) protocol of the OSI reference model is called "frame data," or simply a "frame." The packet configured according to the third layer (network layer) protocol is known as an "IP packet." In the embodiment, the line interface 390 analyzes the electronic signals to receive frames, and provides these frames (hereinafter termed simply "packets") to the data processor 380.

The data processor 380 has a priority determination module 330, a load measuring module 370, and a packet sender 375. The data processor 380 provides packets, received from the line interface 390, to the packet processor 100. At this time, the priority determination module 330 in the data processor 380 determines the priority of each packet (hereinafter termed the "processing priority"). In the embodiment, the processing priority is expressed as one of two levels, "low," and "high." The details of the functions of the data processor 380 will be described below.

The packet processor 100 has a packet forwarding module 110, a packet buffer 112, a control information table 122, a header analyzer 125, a destination determination module 130, and a destination table 132. These tables 122 and 132 are stored in memory (not shown).

The packet buffer 112 is a memory for temporarily storing packet that have been received from the data processor 380. The header analyzer 125 extracts the destination (for example, the destination IP address) from the packet header, and provides the destination to the destination determination module 130. The destination determination module 130 determines the physical port P from which the packet is to be outputted depending on the destination (hereinafter termed the "output physical port"). The output physical port is a physical port P that can be used to communicate with the destination. That is, the output physical port is able to send the packet so that the packet will ultimately arrive at the destination through a communication path such as lines and relaying devices. The packet forwarding module 110 provides a packet sending instruction to the data processor 380. The sending instruction includes information for identifying the output physical port (hereinafter termed the "output physical port information") and the packet itself. The data processor 380 supplies the sending instruction to the line interface 390. The line interface 390 converts the packet into electrical signals in accordance with the sending instruction, and outputs the signals from the output physical port.

Note that the data processor 380 may supply packets to the packet processor 180 with a faster frequency than the processing speed of the destination determination module 130 (for example, when the number of packets to be relayed is large). In this case, the plurality of packets awaiting processing is stored in the packet buffer 112. The packet forwarding module 110 determines the processing order in accordance with the packet processing priority (explained in detail below).

Note that redundant communication paths may be configured in preparation for network equipment failures (for example, failures in switching devices). In this case, a plurality of physical ports P can be candidates for the output physical port. In such a case, the destination determination module 130 selects an output physical port from among the plurality of candidates in accordance with the processing priority. In the embodiment, a first selecting mode and a second selecting mode may be used as this selecting mode. (This will be explained in detail below.)

The power mode controller 910 of the first switching device SW1 controls the power mode of the first switching device SW1. In the embodiment, a first power mode (also termed "standby mode") and a second power mode (also termed "active mode") may be used. In the first power mode, the amount of power consumed by the first switching device SW1 is smaller than that in the second power mode. Additionally, the processing capability of the first switching device SW1 in the second power mode is higher than that in the first power mode (that is, the number of packets that can be processed per unit time is greater). In the embodiment, the packet processor 100 is in an operating state when in the second power mode, and controls the forwarding of packets. On the other hand, when in the first power mode the packet processor 100 stops the power supply to part of the electronic circuitry within the packet processor 100 to stop the forwarding function. The control of the power modes will be described below.

Three switching devices SW2, SW3, and SW4 are connected to the first switching device SW1. In the embodiment, the second switching device SW2 is connected to the first physical port P1, the third switching device SW3 is connected to the second physical port P2, and the fourth switching device SW4 is connected to the third physical port P3

Note that in the embodiment, each of the switching devices SW1, SW2, SW3, and SW4 have identical configurations. In FIG. 1, the configurations of the three switching devices SW2, SW3, and SW4 are simplified. Furthermore, the ending number of the reference characters of each of the switching devices SW1 through SW4 represents identifier of the individual switching devices. Hereinafter, the identifying characters will be omitted when it is not necessary to discriminate between the individual switches (thus these switching devices SW1 through SW4 are termed simply "switching devices SW" below)

Figure 2:
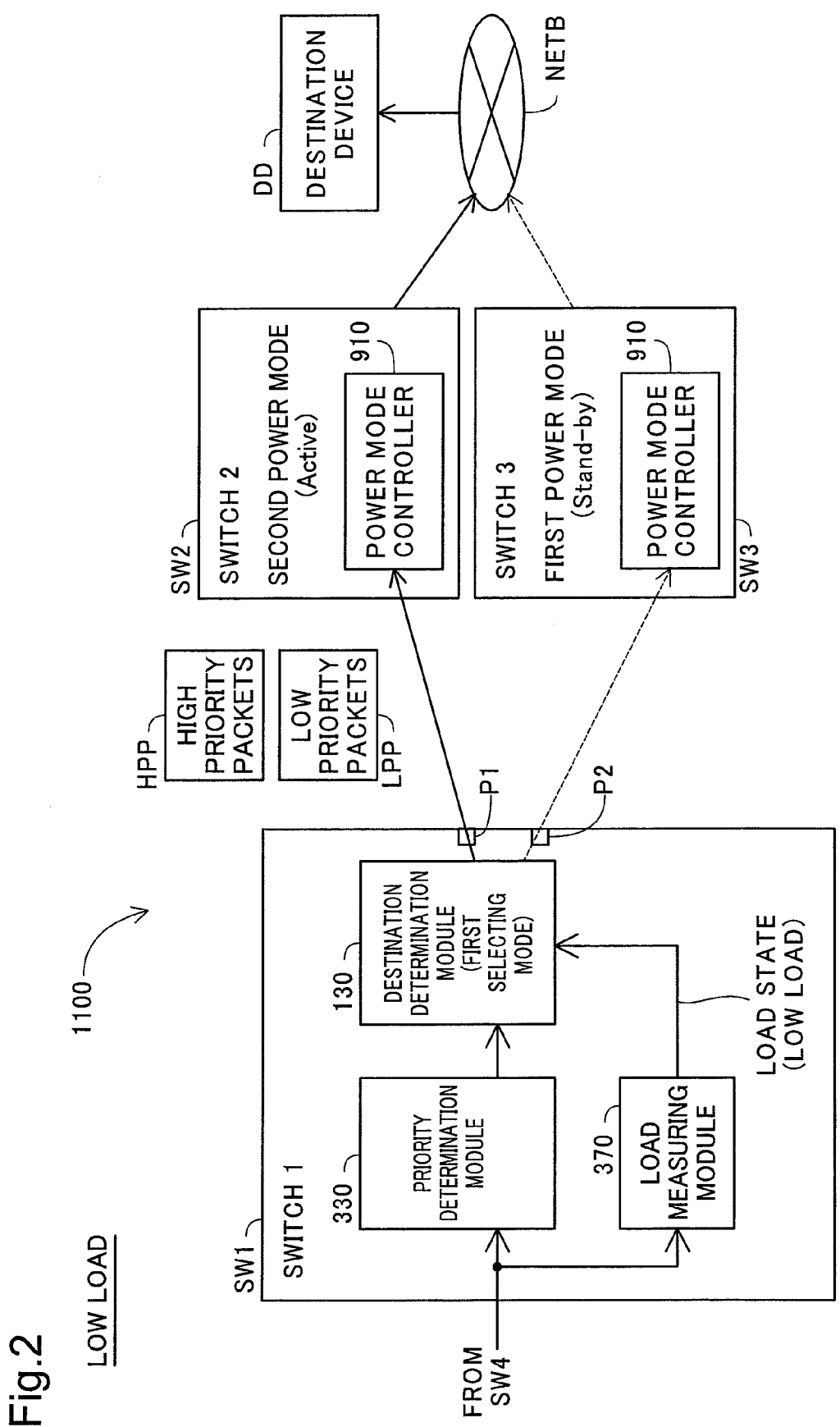
FIG. 2 is a schematic diagram illustrating an operating state of the network system 1100.

FIG. 2 and FIG. 3 are schematic diagrams illustrating the operating state of the network system 1100. As shown in these figures, another network system NETB is connected to the network system 1100. Specifically, the respective second switching device SW2 and third switching device SW3 are connected to the network system NETB. Furthermore, the destination device DD (for example, a personal computer) is also connected to the network system NETB. Note that this network system NETB may use a relaying device such as a router or switching device to couple the second switching device SW2, the third switching device SW3 and the destination device DD.

FIG. 2 and FIG. 3 illustrate the case wherein a packet is sent to the destination device DD from a fourth switching device SW4 through the first switching device SW1. In these figures, it is assumed that a packet from a server (not shown) is sent to the destination device DD through the fourth switching device SW4. In the embodiment, two communication paths couple the first switching device SW1 and the destination device DD. One of the paths arrives at the destination device DD from the first switching device SW1 through the second switching device SW2 and the network system NETB. The other path arrives at the destination device DD from the first switching device SW1 through the third switching device SW3 and the network system NETB. In this way, the first physical port P1 and the second physical port P2 are output physical port candidates for packets whose destination is the destination device DD.

FIG. 2 illustrates the case wherein the communication load is low. FIG. 3 illustrates the case wherein the communication load is high. First, the operating state in FIG. 2 will be explained. In this state, the power mode of the second switching device SW2 is the second power mode (active mode), and the power mode of the third switching device SW3 is the first power mode (standby mode). Furthermore, the selecting mode for the destination determination module 130 is the first selecting mode.

In the first switching device SW1, the priority determination module 330 determines the processing priority from "Low." and "High" according to the packet header for each individual packet (described in detail below). The destination determination module 130 selects the output physical port in accordance with the processing priority. In the first selecting mode, the destination determination module 130 selects the first physical port P1 for both the high priority and the low-priority. The result is that the first switching device SW1 sends both the high priority packet HPP and the low priority packet LPP from the first physical port P1 to the second switching device SW2. These packets HPP and LPP will arrive at the destination device DD through the network system NETB.

In the state illustrated in FIG. 2, the communication load is low, and thus it is possible to suppress problems with packet forwarding in the second switching device SW2 (where these problems are, for example, loss of packets, excessive packet forwarding delays, or the like). It is also possible to reduce the power consumption of the network system 1100 because the power mode of the third switching device SW3 is the first power mode.

Next, the operating state of FIG. 3 will be explained. There are two differences from the state illustrated in FIG. 2. The first difference is that the power mode of the fourth switching device SW4 is the second power mode (active mode). The second difference is that the selection mode in the destination determination module 130 of the first switching device SW1 is the second selecting mode. In the second selecting mode, the destination determination module 130 uses both the first physical port P1 and the second physical port P2 as output physical ports for the low priority. That is, packets whose processing priority is low are distributed to the two physical ports P1 and P2. The output physical port for the high priority is the same as in FIG. 2. The other configurations are the same as in FIG. 2.

The high priority packet HPP arrives at the destination device DD in the same manner as in FIG. 2. On the other hand, part of the low priority packets LPP arrive at the destination device DD through the third switching device SW3 and the network system NETB. In this way, the relaying of packets whose destination is the destination device DD is distributed to the second switching device SW2 and the third switching device SW3. Consequently, even when the communication load is high it is still possible to suppress problems with packet forwarding.

For the high priority packets HPP, the route passing through the second switching device SW2 is used regardless of the selecting mode. For the low priority packets LPP, on the other hand, the route passing through the third switching device SW3 whose power mode is changeable is used selectively. The result is that priority is given to the reliability of the relaying of the high priority packets HPP over the reliability of the relaying of the low priority packets LPP. This makes it possible to control both power consumption and the reliability of the data relaying. Furthermore, in the embodiment the power mode of the second switching device SW2, which relays the high priority packets HPP in both the state shown in FIG. 2 and the state shown in FIG. 3, maintains the second power mode (active mode), rather than the first power mode (standby mode). Consequently, it is still possible to suppress problems with the forwarding of the high priority packets HPP even when switching the operating state between the state in FIG. 2 and the state in FIG. 3. Furthermore, for the forwarding of the high priority packets HPP, the use of the communication route passing through the third switching device SW3 whose power mode is changeable is prevented. The result is the ability to suppress reduction in reliability of the relaying of the high priority packets HPP.

Note that the priority determination module 330 determines the processing priority according to the packet header. The destination determination module 130 determines its own selecting mode in accordance with the communication load. The third switching device SW3 determines its own power mode in accordance with the communication load. The communication load is recorded in the statistical information table 332 (FIG. 1). These will be explained in detail next.

FIGS. 4A-4G are explanatory diagrams of packets. In the embodiment, the packet PK is a so-called Ethernet frame. FIGS. 4A-4G illustrates the configuration of a typical Ethernet frame. The packet PK includes the layered 2 header H1, the layer 3 header H2, the layer 4 header H3, and data DT.

Figure 4A:
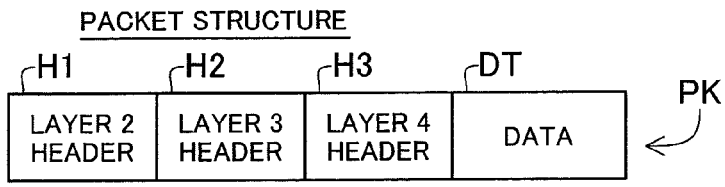
FIGS. 4A-4G are explanatory diagrams regarding a packet.
Figure 4B:
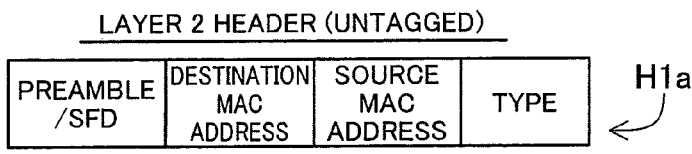
Figure 4C:
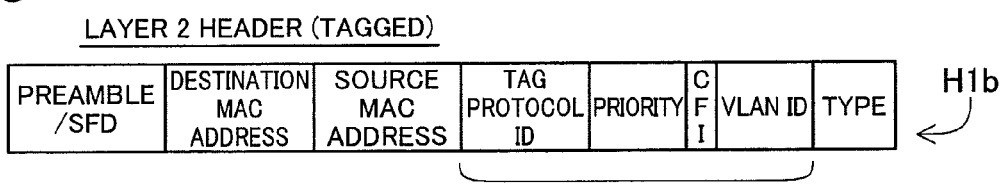

The layer 2 header H1 is determined in accordance with the protocol for the second layer (the data link layer) in the OSI reference model. In the embodiment, there are two types of layer 2 headers H1: the untagged header H1a and the tagged header H1b (FIGS. 4B and 4C). The untagged header H1a includes the destination MAC address field and the source MAC address field. The tagged header H1b is the header for using so-called VLAN (Virtual Local Area Network). The tagged header H1b is a header wherein the tag header for the VLAN is added to the untagged header H1a. The tag header TH includes the VLAN-ID field and the user priority field. The VLAN-ID is the identification number of the VLAN. The user priority indicates the priority order of the packets PK. The user priority is expressed using 3 bits (for eight levels, ranging from 0 to 7), where the higher the numeric value, the higher the priority. The user priority may be set by the transmission source device of the packet PK (for example, a personal computer). The user priority may also be set (overwritten) by a relaying device (such as a router) that relays the packet PK.

Figure 4D:
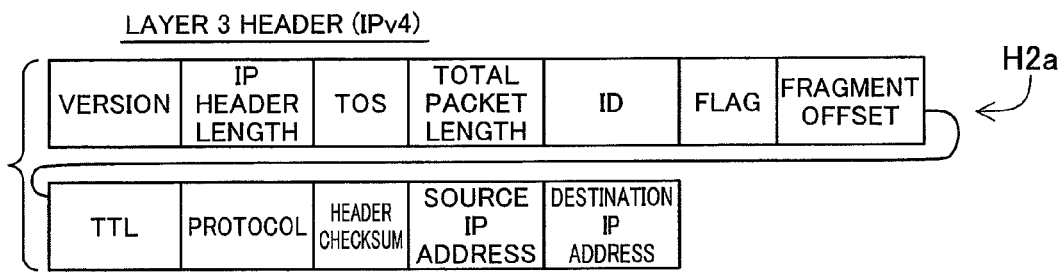
Figure 4E:
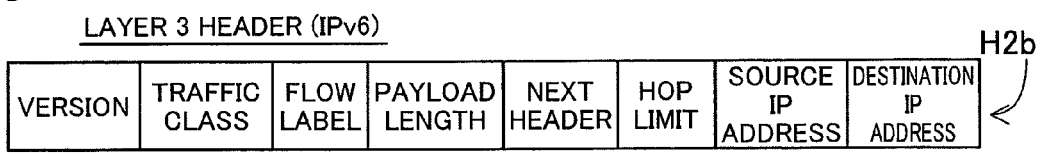

The layer 3 header H2 is determined in accordance with the third layer (the network layer) protocol in the OSI reference model. In the embodiment, as the layer 3 header H2, the IPv4 header H2a and the IPv6 header H2b are used (FIGS. 4D and 4E). Each of these headers H2a and H2b include the source IP address field and the destination IP address field. The IPv4 header H2a includes the TOS (Type of Service) field as well. The TOS is expressed by eight bits. The top three bits are called the IP precedence, and represent the priority of the IP packet. The priority becomes higher as the value of the IP precedence becomes larger. The top six bits of the TOS field may also be handled as the so-called DSCP (Differentiated Service Code Point). The DSCP represents the 64-level (6 bit) priority. Such DSCP is defined by RFC2474 and RFC2475 (the RFC (Request for Comment) is the standard documents of the IETF (Internet Engineering Task Force) standards organization). Note that the TOS may be set by the transmission source device of the packet PK. The TOS may also be set (overwritten) by a relaying device that relays the packet PK. Note that the IP packet is the unit for data transmission on the network layer.

Figure 4F:
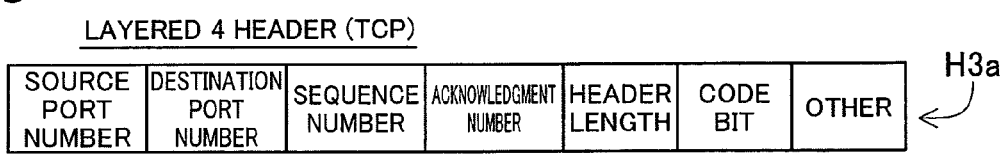
Figure 4G:
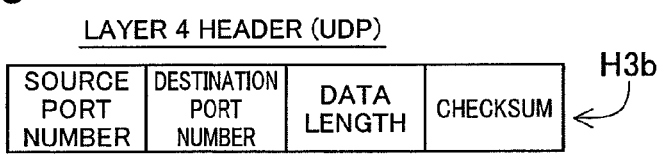

The layer 4 header H3 is determined in accordance with the fourth layer (the transport layer) protocol in the OSI reference model. In the embodiment, the TCP header H3a and the UDP header H3b are used as the layer 4 headers H3 (FIGS. 4F and 4G). The TCP header H3a is the header for communications in accordance with the TCP (Transmission Control Protocol), and the UDP header H3b is the header for communications in accordance with UDP (User Datagram Protocol). Each of these headers H3a and H3b include the source port number field and a destination port number field. Note that these port numbers are numbers in accordance with the layer 4 protocol, and have nothing to do with the physical ports P for connecting the lines (FIG. 1).

FIG. 5 is an explanatory diagram for the priority table 334. In FIG. 5, the priority table 334 of the first switching device SW1 is illustrated as an example. The correspondence relationship between the header information and the processing priority is stored in the priority table 334. The priority determination module 330 (FIG. 1) references the packet header (FIGS. 4A-4G) and the priority table 334 to determine the processing priority of the packet.

In the embodiment illustrated in FIG. 5, a correspondence relationship is established between the processing priority and a combination of the VLAN-ID, the user priority (UPRI), the TOS (IP precedence) and other information. In the embodiment, the processing priority is expressed in two levels of low (PRI_0) and high (PRI_1). The "*" mark in FIG. 5 indicates a match with any values.

The correspondence relationship R1 in the first row indicates that the processing priority is Low for a packet that satisfies the conditions of "VLAN-ID=1, UPRI=0, and TOS (IP precedence)=0." The correspondence relationship R2 in the second row indicates that the processing priority is High for a packet that satisfies the condition of "VLAN-ID=1, UPRI=2, and TOS=2." The correspondence relationship R3 in the third row indicates that the processing priority is High for any packet whose VLAN-ID is "2."

A variety of other correspondence relationships with different header information (omitted from the figure), in addition to the correspondence relationships R1 through R3 illustrated in FIG. 5, are stored in the priority table 334. In the embodiment, concerning packets whose VLAN-ID is "1", if at least either one among the user priority and the TOS (IP precedence) is greater than or equal to 2, then the processing priority is High (not shown). If both the user priority and the TOS (IP precedence) are 1 or less, then the processing priority is Low. The priority determination module 330 (FIG. 1) determines the processing priority of any frame data by referencing the priority table 334. The priority table 334 is set in advance in accordance with instructions from the user. Note that the priority table 334 may define only part of all the possible combinations of the header information. In this case, the priority determination module 330 may use a predetermined processing priority (for example, High) for header information for which there is no definition in the priority table 334.

Figure 6:
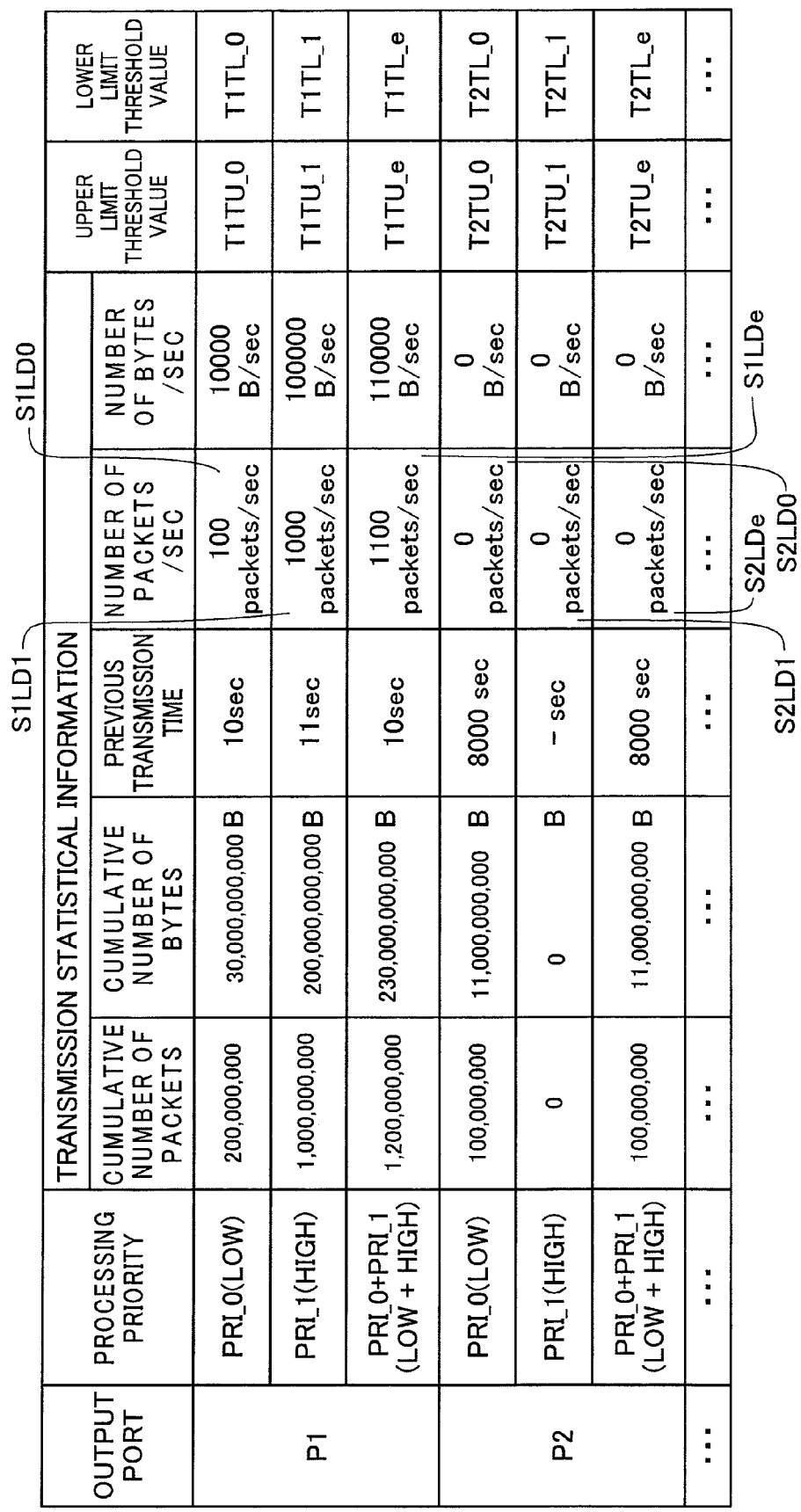
FIG. 6 is an explanatory diagram of a transmission statistical information table 332T.

FIG. 6 is an explanatory diagram for the transmission statistical information table 332T. In FIG. 6, the transmission statistical information table 332T for the first switching device SW1 is illustrated for one example. The transmission statistical information table 332T stores the correspondence relationships between the output ports, the processing priority, the cumulative number of packets, the cumulative number of bytes, the time of the previous transmission, the number of packets/sec, the number of bytes/sec, an upper limit threshold value, and a lower limit threshold value. In the below, the upper limit threshold value is termed simply the "upper limit" and the lower limit threshold value is termed simply the "lower limit."

The "output port" indicates the physical port P having output the packet. The "cumulative number of packets" is the cumulative value for the number of packets having been sent by the output port (the physical port P). The "cumulative number of bytes" is the cumulative value for the amount of data having been sent by the output port (in units of bytes). These cumulative values are cumulative values since the power of the switching device SW has been turned ON. The "time of the previous transmission" indicates the time at which the last packet has been sent by the physical port P. This time is expressed by the amount of time elapsed from the time of that transmission until the present time. The "number of packets/sec" is the number of packets transmitted per unit time. The "number of bytes/sec" is the amount of data transmitted per unit time. Any method may be used for calculating the amount per unit time. For example, an average value from a predetermined time in the past (for example, one minute ago) until the present time may be used. The load measuring module 370 (FIG. 1) records these statistical information for each combination of the processing priority and the output port. In the embodiment illustrated in FIG. 6, the statistical information for "processing priority=Low" and the statistical information for "processing priority=High", and the total for both, are stored in the transmission statistical information table 332T for each output port.

The three transmission loads S1DL0, S1LD1, and S1LDe indicate loads on the first physical port P1. The zeroth transmission load S1DL0 indicates the load (number of packets/sec) for the low priority, and the first transmission load S1LD1 indicates the load (number of packets/sec) for the high priority. The total transmission load S1LDe indicates the total thereof. Three transmission loads S2DL0, S2LD1, and S2LDe indicate the loads on the second physical port P2. The zeroth transmission load S2DL0 is the load for the low priority, the first transmission load S2LD1 is the load for the high priority, and the total transmission load S2LDe is the total thereof. As described below, in the embodiment, the upper limit and the lower limit indicates threshold values for the "number of packets/sec." The destination determination module 130 (FIG. 1) switches the selecting mode in accordance with these upper and lower limits. Note that the upper and lower limits are set in advance in accordance with instructions from the user.

FIG. 7 is an explanatory diagram for the reception statistical information table 332R. In FIG. 7, the reception statistical information table 332R for the first switching device SW1 is illustrated as an example. The difference from the transmission statistical information table 332T (FIG. 6) is only the point that information regarding the received packets is stored instead of information regarding the transmission packets.

The "reception port" indicates the physical port P having received the packet. The "cumulative number of packets" and the "curative number of bytes" indicate the quantity of packets (the quantity of data) having been received by the reception port (the physical port P). The "time of previous arrival" indicates the time at which the last packet arrived at the physical port P. This time is expressed by the amount of time elapsed from the time of that arrival until the present time. The "number of packets/sec" is the number of packets received per unit time. The "number of bytes/sec" is the amount of data received per unit time. As with the transmission statistical information table 332T in FIG. 6, the load measuring module 370 (FIG. 1) records this statistical information for each combination of the processing priority and the reception port. The method for calculating the cumulative values and the method for calculating the quantities per unit time are the same as for the transmission statistical information table 332T illustrated in FIG. 6.

The upper limit and lower limit indicate threshold values for the "number of packets/sec." As will be described below, in the embodiment, the power mode controller 910 switches the power mode of the switching device SW in accordance with these upper and lower limits. Note that the upper and lower limits are set in advance in accordance with the instructions from the user.

Note that the user is able to check the statistical information table 332 (332T or 332R) through an operating panel or control terminal. The operating panel is a device equipped on the switching device SW, and has a display such as a liquid crystal display along with an input device such as buttons (not shown). The control terminal is a terminal (not shown) that is connected to the switching device SW. The user is able to check not only the statistical information tables 332, but other various information as well. Furthermore, the user is able to input various instructions through the operating panel or the control terminal.

FIG. 8 is an explanatory diagram for the destination table 132. FIG. 8 shows the destination table 132 for the first switching device SW1 as one example. The destination table 132 stores the correspondence relationships between the destination address, the processing priority, and an output port list. The output port list includes a list for low loads and an addition list for high loads. The destination address indicates the destination of the packet. In the embodiment, the destination address corresponds to the destination IP address of the packet. The output port list indicates candidates for the output physical port. The low load list is used when the communication load is low. The high load addition list is a list that is added when the communication load is high.

The first correspondence relationship DR1 and the second correspondence relationship DR2 indicate the output port list for the first address DA1. This first address DA1 is the IP address of the destination device in FIG. 2 and FIG. 3. When the communication load is low, the first physical port P1 is a candidate regardless of the processing priority. When the communication load is high, the result will be as follows. The second physical port P2 is added to the candidates for a packet whose processing priority is low. That is, the two physical ports P1 and P2 are the candidates. There is no addition list for packets whose processing priority is high. That is, the physical port P1 is the candidate.

If there is only a single candidate, then the destination determination module 130 (FIG. 1) uses that candidate as the output physical port. When the number of candidates is plural, then the destination determination module 130 selects a single output physical port, from among the multiple candidates, in accordance with a predetermined method. Any method may be used for this selecting. For example, the destination determination module 130 may calculate a hash value from the header information, and may select a single output physical port in accordance with the hash value. Any field may be used as header information that is used in calculating the hash value (for example, at least part of the headers H1 through H3 in FIGS. 4A-4G may be used). Here fields that have been determined in advance may be used. Furthermore, the destination determination module 130 may select a single output physical port using a so-called round robin technology.

Note that the destination address in the destination table 132 need not be limited to a single address, but may use a range of addresses. Furthermore, the processing priority, the low load list, and the high load addition list are set in advance in accordance with user instructions. The output port list may be related with the VLAN-ID or any other information in addition to the destination address and the processing priority.

FIG. 9 is an explanatory diagram for the control information table 122. The control information table 122 stores header information of packets received from the data processor 380. In the embodiment, the control information table 122 shows an ordered list for each processing priority. The order is the same as the received order of the packets. This list shows a list of packets. Such packet list is also known as the "queue." The control information table 122 shows two different queues, the high processing priority queue HPQ and the low processing priority queue LPQ.

FIG. 9 illustrates the case wherein the packet processor 100 has received five packets a, b, c, d, and e, in that order. Here it is assumed that the processing priority is Low for the three packets a, b, and e, and the processing priority is High for the two packets c and d. As will be described below, the packet forwarding module 110 (FIG. 1) determines the processing order for the frame data in accordance with the control information table 122.

Figure 10:
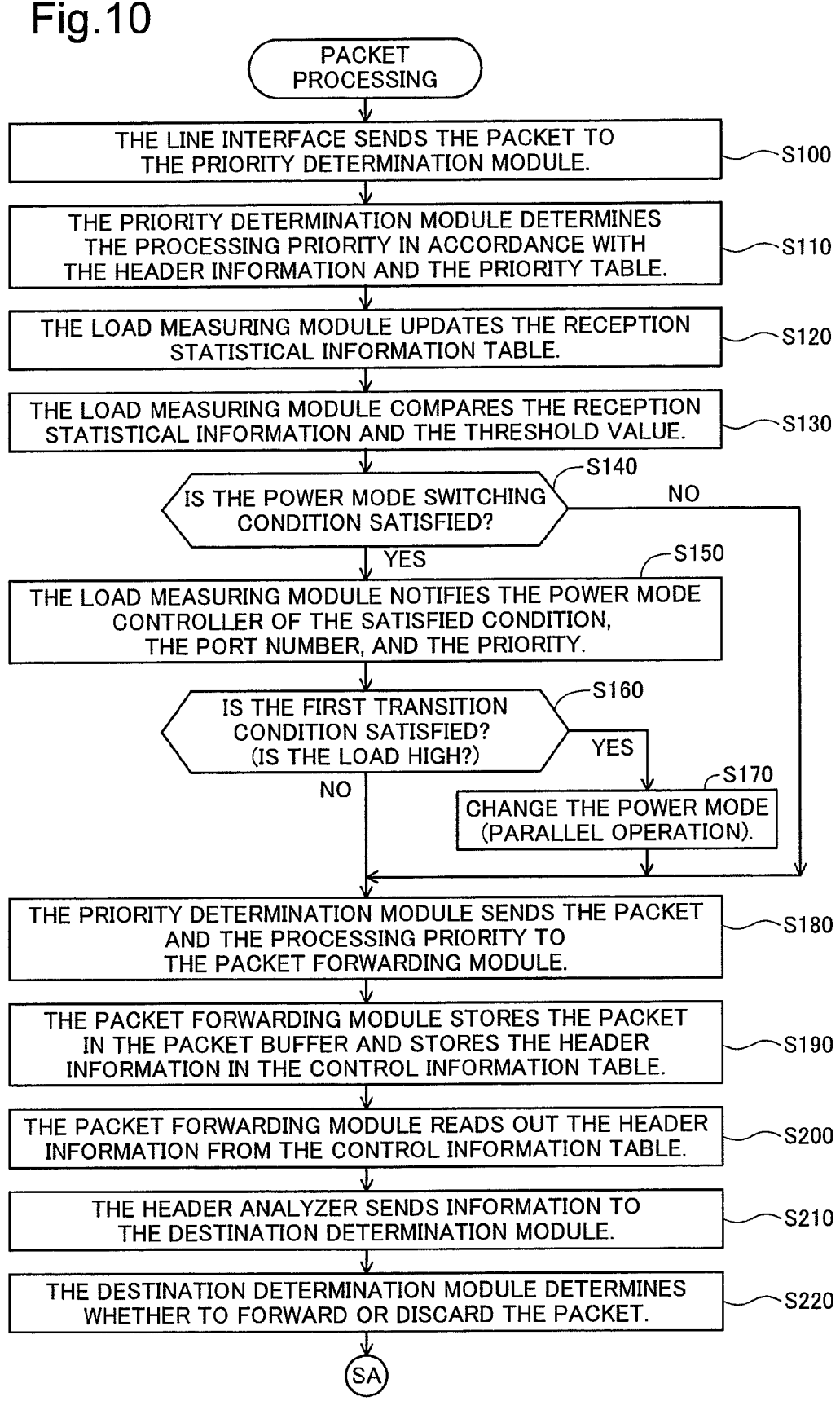
FIG. 10 is a flowchart illustrating the sequence of packet processing.

FIG. 10 is a flowchart illustrating the packet processing procedure. The packet processing is the process of relaying the packets. The switching device SW (FIG. 1) begins the process in FIG. 10 in response to the receipt of a packet.

In the first step S100, the line interface 390 (FIG. 1) receives a packet from the physical port P and sends that packet to the priority determination module 330. Next, in step S110, the priority determination module 330 extracts the part to be used in determining the processing priority from the packet header (FIGS. 4A-4G). Then the priority determination module 330 uses the extracted part as a search key to search the key in the priority table 334 (FIG. 5). The processing priority relating to the header information is used by the priority determination module 330 as the processing priority for the packet.

Next, in step S120, the load measuring module 370 (FIG. 1) updates the reception statistical information table 332R (FIG. 7) in accordance with the received packet, the physical port P having received the packet, and the processing priority.

Next, in step S130, the load measuring module 370 (FIG. 1) determines whether or not the power mode switching condition is satisfied, through comparing the updated reception statistical information with a threshold value. If the current power mode is the first power mode (standby mode), then the switching condition is the condition for changing the power mode from the first power mode to the second power mode (hereinafter termed the "first transition condition"). In the embodiment, the first transition condition is as set forth below.

(First transition condition C1) The total value for the load (number of packets/sec) for received packets for all processing priorities for all reception ports is above a first threshold value (upper limit).

The satisfaction of the first transition condition C1 by the reception statistical information means that the communication load is high.

If the current power mode is the second power mode (active mode), then the switching condition is the condition for changing the power mode from the second power mode to the first power mode (hereinafter termed the "second transition condition"). In the embodiment, the second transition condition is as set forth below.

(Second transition condition C2) The total value for the load (number of packets/sec) for received packets for all processing priorities for all reception ports is below a second threshold value (lower limit).

The satisfaction of the second transition condition C2 by the reception statistical information means that the communication load is low.

Note that the first and the second threshold values are set in advance in accordance with user instructions. (In the embodiment, these threshold values are stored in the reception statistical information table 332R (not shown).) The second threshold value (a lower limit of the second power mode) is preferably less than the first threshold value (a upper limit of the first power mode). Doing so makes it possible to suppress excessively frequent changes in the power mode.

If a switching condition is satisfied (S140: Yes), then in the next step S150, the load measuring module 370 (FIG. 1) provides notification to the power mode controller 910. This notification includes the satisfied switching condition, the port number of the port having received the packet, and the processing priority of the packet. If the first transition condition C1 is satisfied (S160: Yes), then the power mode controller 910 changes the power mode (S170). The change in the power mode is performed in parallel with the packet processing. The process then advances to step S180. The change in the power mode will be explained below.

If no switching condition is satisfied (S140: No), then steps S150 through S170 are skipped, and processing advances to step S180.

In step S180, the priority determination module 330 sends the packet and the processing priority to the packet processor 100. In the next step S190, the packet forwarding module 110 stores the received packet in the packet buffer 112. The packet forwarding module 110 then extracts the header information from the packet, and stores the header information in the control information table 122 (FIG. 9) in accordance with the processing priority. Note that if there is no free space in the packet buffer 112, then the packet forwarding module 110 discards the received packet.

The processes from the next step S200 are the processes for forwarding the packet stored in the packet buffer 112 (FIG. 1). A single packet is forwarded by the processes from the step S200. In step S200, the packet forwarding module 110 (FIG. 1) selects the target packet for packet forwarding. Specifically, the packet forwarding module 110 selects one packet from the control information table 122 (FIG. 9), and reads out the header information of that packet.

As the method for selecting the single (target) packet, any method that provides priority to packets with the higher processing priority may be employed. For example, the so-called priority queuing method may be used. In this method, if there is a packet stored in the high priority queue HPQ (FIG. 9), then a packet is selected from the high priority queue HPQ. If there is no packet stored in the high priority queue HPQ, then a packet is selected from the low priority queue LPQ. The packet selection order in the respective high priority queue HPQ and low priority queue LPQ is the same as the received order of the packets.

In the next step, S210, the header analyzer 125 (FIG. 1) extracts information from the read out header information, and provides this information to the destination determination module 130. The extracted information is information to be used in the processing by the destination determination module 130. In the embodiment, this information includes the destination IP address. Furthermore, the header analyzer 125 provides the processing priority of the selected target packet to the destination determination module 130. Any method may be used for specifying the processing priority. For example, the header analyzer 125 may specify the processing priority according to the type of the queue storing the header information. Instead, in step S190, the packet forwarding module 110 may store, in the control information table 122, information indicating the processing priority, in addition to the header information. In this case, the header analyzer 125 may specify the processing priority through referencing the control information table 122.

In the next step, S220, the destination determination module 130 (FIG. 1), in accordance with the received header information, makes a determination as to whether to forward or discard the target packet. For example, the destination determination module 130 may make this determination in accordance with a filter table (not shown). The filter table defines conditions for discarding packets. Any conditions may be used as the discarding conditions. For example, the condition that a value of a predetermined field is set to a predetermined value may be used. Specifically, a condition such as "the destination port number for the layer 4 header H3*a* or H3*b* (FIGS. 4F and 4G) is 80" may be used.

Figure 11:
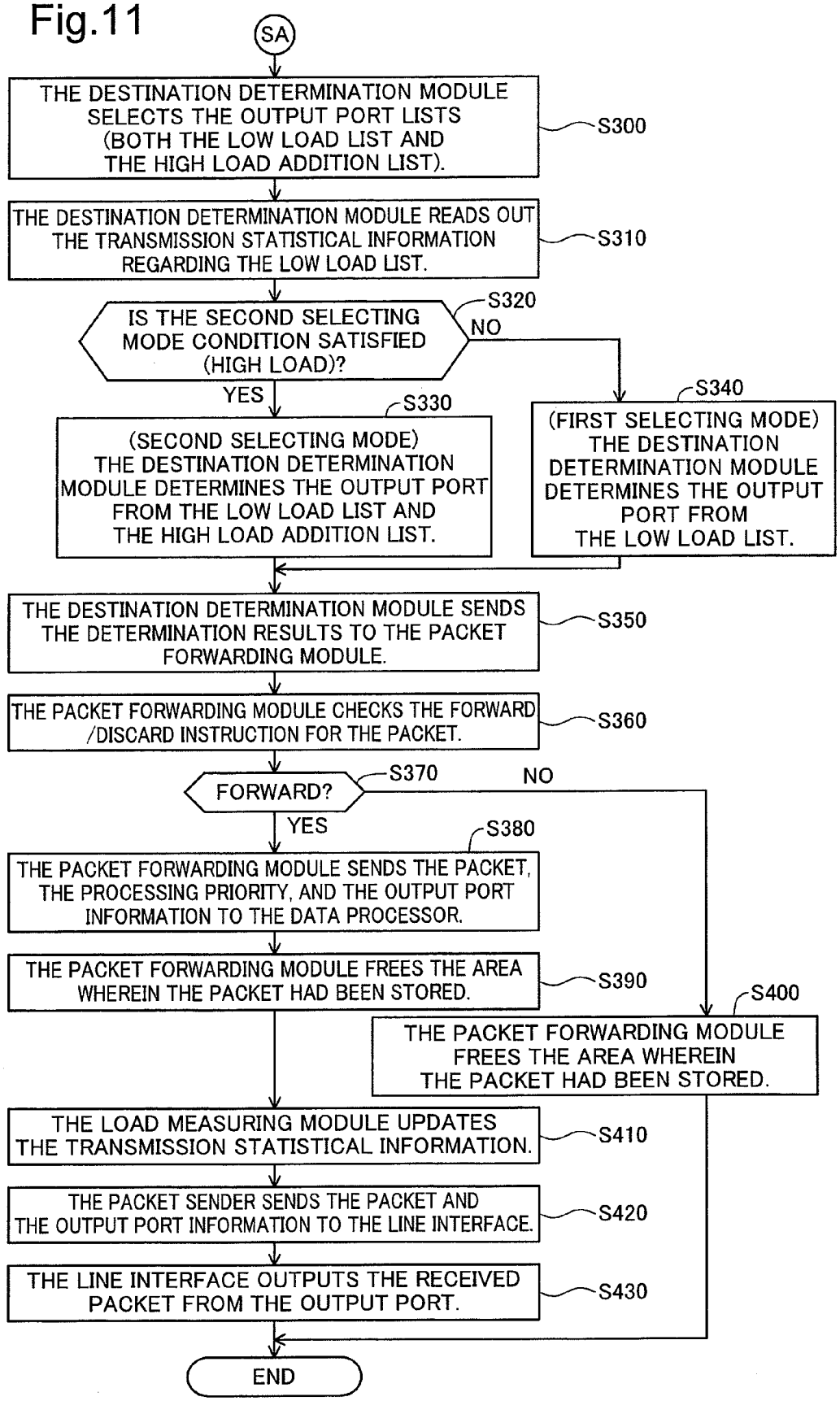
FIG. 11 is a flowchart illustrating a sequence following the flowchart in FIG. 10.

FIG. 11 is a flowchart illustrating the procedure following the flowchart in FIG. 10. Step S300 is the step following step S220 in FIG. 10. In this step S300, the destination determination module 130 (FIG. 1) references the destination table 132 (FIG. 8) to select the output port list relating to the destination IP address. The selected output port list includes the low load list and the high load addition list. These lists represent the total for all of the processing priorities. For example, in the embodiment illustrated in FIG. 8, when the destination IP address is the first address DA1, then the low load list is the "first physical port P1." The high load addition list is "second physical port P2."

In the next step, S310, the destination determination module 130 (FIG. 1) reads out the transmission statistical information relating to the low load output port list from the transmission statistical information table 332T (FIG. 6). Then, in the next step, S320, the destination determination module 130 determines whether or not the condition for the second selecting mode (hereinafter termed the "second selecting mode condition") is satisfied. In the embodiment, the second selecting mode condition are as set forth below.

(Second selecting mode condition SC) The total output load on the low load ports is greater than the selecting upper limit.

Here the "low load ports" refers to the physical ports P that are included in the low load output port list. The "total output load of the low load ports" refers to the total value for the loads (number of packets/sec) for the output packets for all processing priorities for all low load ports.

For example, the case wherein the destination is the first address DA1 will be explained for the embodiment illustrated in FIG. 8. In this case, the low load output port list represents "first physical port P1." Furthermore, in FIG. 6 the total transmission load S1LDe corresponds to the total value in the second selection mode condition SC, and the upper limit T1TU_e thereof corresponds to the selecting upper limit. If the total transmission load S1LDe is greater than or equal to the upper limit T1TU_e, then the second selecting mode condition SC is satisfied. The selecting upper limit is set in advance to a value that is somewhat below the maximum value for the processing capability of the relaying device that is connected to the low load output port (hereinafter termed a "downstream relaying device"). The fact that the transmission statistical information satisfies the second selecting mode condition SC means that the quantity of packets that are output from the low load output ports is going to exceed the processing capability of the downstream relaying devices. Here the upper limit T1TU_e is preferably smaller than the processing capability of the second switching device SW2 (FIG. 1) that is connected to the first physical port P1.

Note that when a plurality of physical ports P are included in the low load output port list, then the total value of the upper limit threshold values associated with each of the individual ports may be used as the selecting upper limit. For example, if the first physical port P1 and the second physical port P2 are included in the output port list, then the total of the first physical port P1 upper limit T1TU_e and the second physical port P2 upper limit T2TU_e may be used as the selecting upper limit (FIG. 6). Here the upper limit T2TU_e is preferably smaller than the maximum value of the processing capability of the third switching device SW3 (FIG. 1) that is connected to the second physical port P2.

When the second selecting mode condition SC is satisfied, then the destination determination module 130 (FIG. 1) specifies that the selecting mode to be used is the second selecting mode. In the next step S330 in FIG. 11, the destination determination module 130 determines the output physical port in accordance with the second selecting mode. First the destination determination module 130 uses, as candidates, the sum of the low load output port list and the high load addition list. These lists to be used here are lists relating to the processing priorities of the packet. Following this, the destination determination module 130 selects a single output physical port from among the candidates. For example, the case wherein the destination IP address is the first address DA1 will be explained for the embodiment illustrated in FIG. 8. The operating state in FIG. 3 illustrates this case. The first and second physical ports P1 and P2 are candidates for low priority. Either one among the first and the second physical port P1, P2 is selected as the output physical port. For high priority, the candidate is the first physical port P1, so the first physical port P1 is selected as the output physical port.

If the second selecting mode condition SC is not satisfied, then the destination determination module 130 (FIG. 1) specifies that the selecting mode to be used is the first selecting mode. In the next step S340 in FIG. 11, the destination determination module 130 determines the output physical port in accordance with the first selecting mode. First the destination determination module 130 uses the low load output port list as the candidates. Here the list that is used is the list that relates to the processing priority of the packet. Next the destination determination module 130 selects a single output physical port from among the candidates. For example, the case wherein the destination IP address is the first address DA1 will be explained for the embodiment illustrated in FIG. 8. The operating state in FIG. 2 illustrates this case. For low priority, the first physical port P1 is the candidate, so the first physical port P1 is selected as the output physical port. Similarly, for high priority, the first physical port P1 is the candidate, so the first physical port P1 is selected as the output physical port.

Note that if the destination determination module 130 (FIG. 1) has determined to discard the packet in step S220 in FIG. 10, then the destination determination module 130 may skip the processes from step S300 through S340.

In step S350, following step S330 and S340, the destination determination module 130 (FIG. 1) sends the determination result to the packet forwarding module 110. The determination result includes either one among a packet forwarding instruction and a packet discarding instruction. These instructions reflect the result of the determination in step S220 in FIG. 10. The packet forwarding instruction includes output physical port information. In the following step S360, the packet forwarding module 110 confirms that the received instruction is the packet forwarding instruction. If the received instruction is a packet forwarding instruction (S307: Yes), then the processing advances to step S380.

In step S380, the packet forwarding module 110 (FIG. 1) reads out the target packet from the packet buffer 112. The packet forwarding module 110 sends the target packet, the output physical port information, and the processing priority of the target packet to the data processor 380. Any method may be used for specifying the processing priority. (For example, the same method as the method explained in step S210 may be used.)

In the next step, S390, the packet forwarding module 110 (FIG. 1) frees the area storing the target packet in the packet buffer 112. This allows the packet forwarding module 110 to use the freed area as a free area for storing a new packet. Furthermore, the packet forwarding module 110 deletes information pertaining to the target packet from the control information table 122.

In the next step S410, the load measuring module 370 (FIG. 1) updates the transmission statistical information table 332T (FIG. 6) in accordance with the target packet, the output physical port information, and the processing priority of the target packet.

In the next step S420, the packet sender 375 (FIG. 1) provides the transmission instruction for the target packet to the line interface 390. The transmission instruction includes the target packet and the output physical port information. In the next step, S430, the line interface 390 sends the packet from the physical port P specified by the output physical port information, in accordance with the instruction. Here the line interface 390 modifies the packet header as appropriate. The modified header may be specified by the destination determination module 130. The packet processing is terminated in response to the completion of the transmission of the packet.

When the received instruction is the packet discarding instruction (S370: No), then the processing advances to step S400. The process in this step S400 is identical to that in step S390, described above. The packet processing is terminated in response to the completion of step S400.

As described above, in the embodiment illustrated in FIG. 2 and FIG. 3, the destination determination module 130 of the first switching device SW1 switches the selecting mode in accordance with the output traffic load (FIG. 11: S320).

Note that the processes from the step S200 in FIG. 10 illustrate the forwarding process for a single frame. Here the forwarding process is performed repetitively until the queue (the control information table 122 (FIG. 9)) becomes empty.

Figure 12:
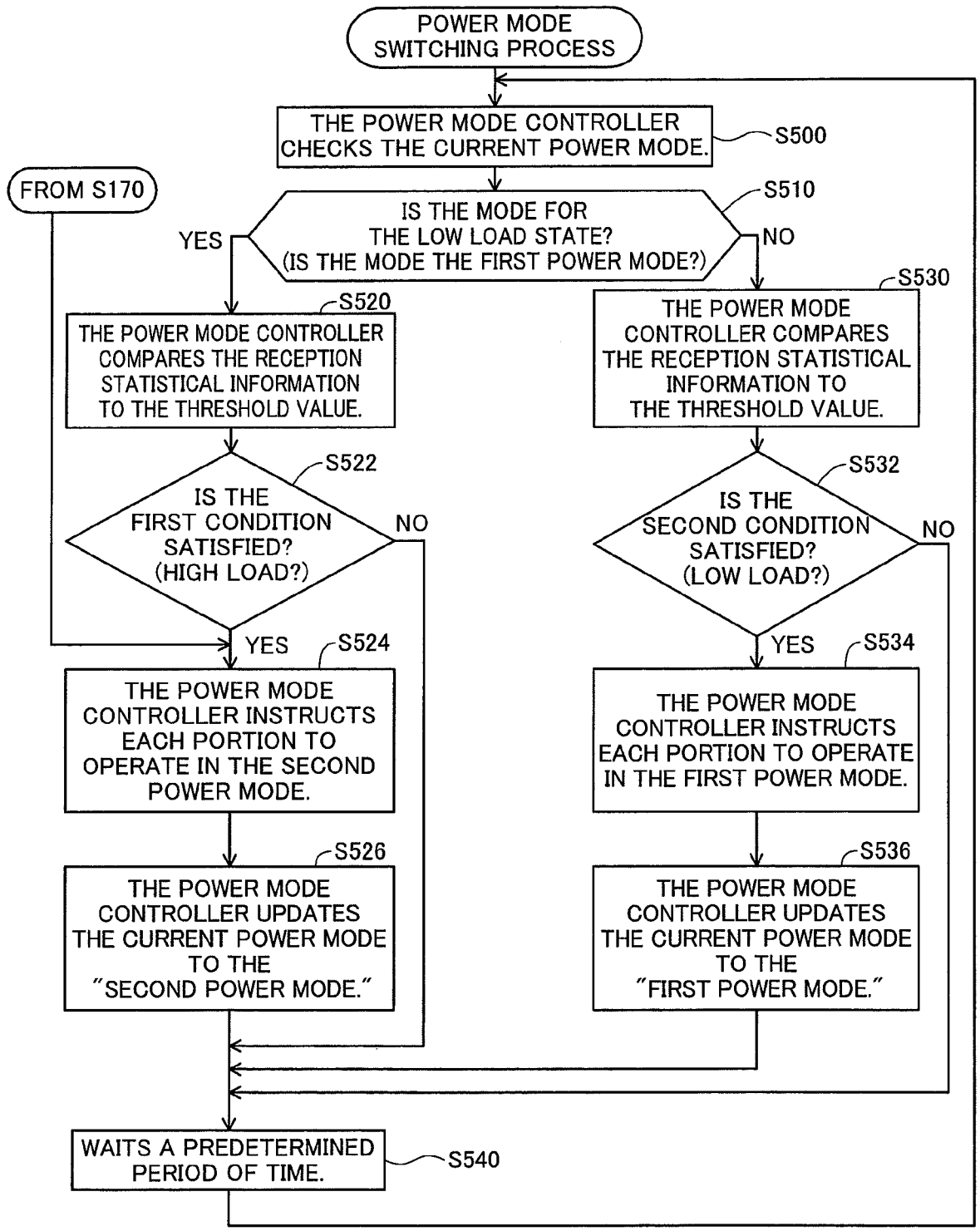
FIG. 12 is a flowchart illustrating a sequence of the power mode switching procedure.
Figure 13:
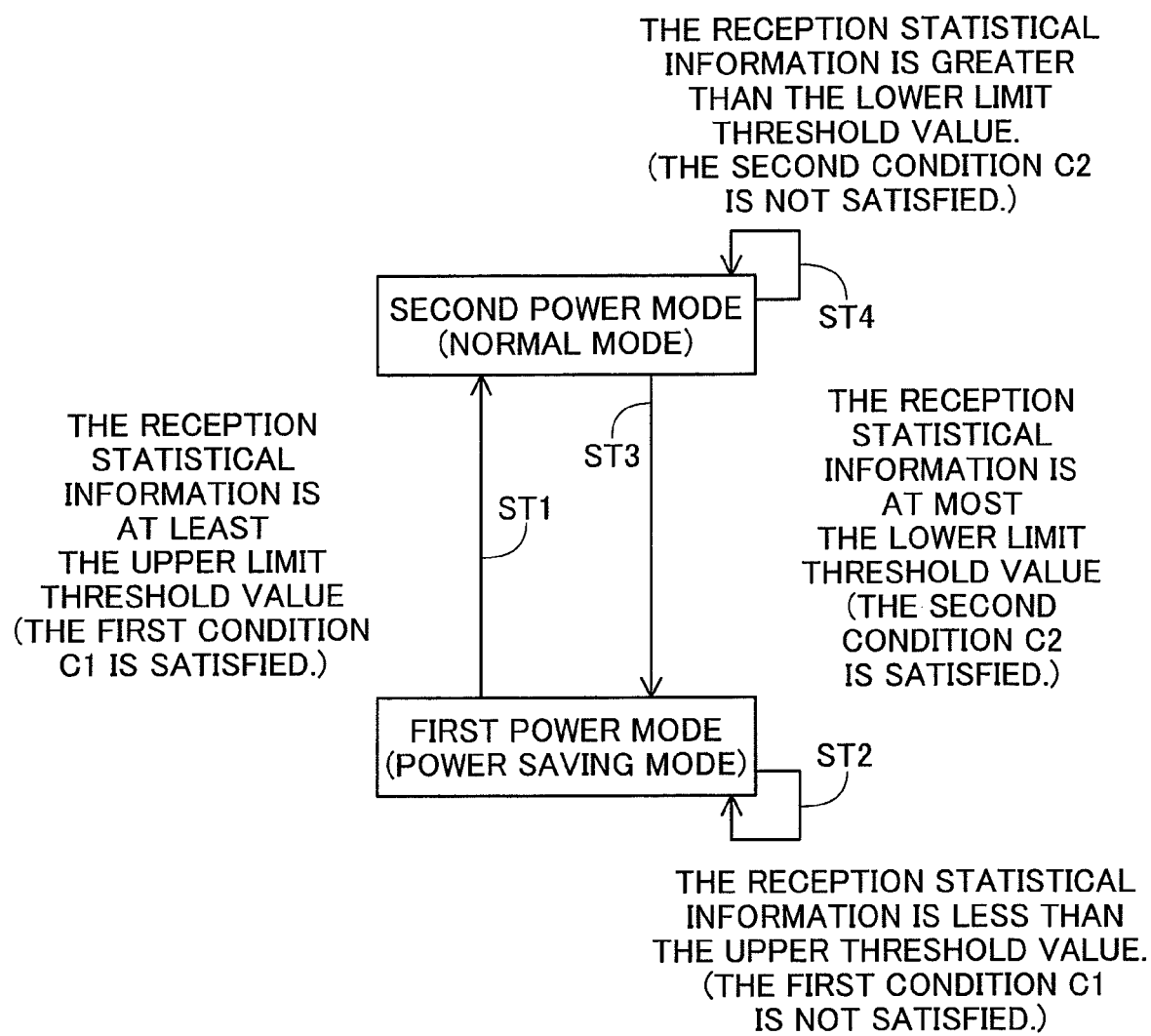
FIG. 13 is an explanatory diagram illustrating the transitions of the power modes.

FIG. 12 is a flowchart illustrating the procedure for the power mode switching processing. The power mode controller 910 (FIG. 1) executes this switching processing independently from the packet processing in FIGS. 10 and 11. FIG. 13 is an explanatory diagram illustrating the power mode transitions. The first power mode and the second power mode are illustrated in FIG. 13.

In the first step S500, the power mode controller 910 (FIG. 1) checks the current power mode. Information indicating the current power mode is stored in memory (not shown) in the power mode controller 910. If the current power mode is the first power mode, then processing advances to step S520 (S510: Yes)

In step S520, the power mode controller 910 (FIG. 1) compares the reception statistical information to a threshold value to determine whether or not the first transition condition C1 is satisfied by the reception statistical information. As described above, the first transition condition C1 indicates that the communication load is high.

If the first transition condition C1 is satisfied (S522: Yes), then next, in step S524, the power mode controller 910 (FIG. 1) changes the power mode from the first power mode to the second power mode. In the embodiment, the power mode controller 910 provides an instruction to the packet processor 100 to operate in the second power mode. The packet processor 100, in response to the instruction, restarts the power supply to the part of the electronic circuitry within the packet processor 100, to commence the packet forwarding. The result is that the processing capability of the packet processor 100 is increased.

In the next step, S526, the power mode controller 910 (FIG. 1) updates the information indicating the current power mode to represent "second power mode."

The power mode transitions from the first power mode to the second power mode in accordance with the steps S524 and S526 described above (FIG. 13: ST1)

In the next step S540, the power mode controller 910 (FIG. 1) waits for a predetermined period of time (for example, 10 seconds) to elapse. After the elapse of the predetermined period of time, the power mode controller 910 returns again to step S500.

If, in step S522, the first transition condition C1 is not satisfied, then the power mode controller 910 skips steps S524 and S526, and advances to step S540. In this case, the first power mode is maintained (FIG. 13: ST2).

If, in step S510 in FIG. 12, the current power mode is the second power mode, then processing advances to step S530.

In step S530, the power mode controller 910 (FIG. 1) compares the reception statistical information to a threshold value to determine whether or not the reception statistical information satisfies the second transition condition C2. As described above, the second transition condition C2 indicates that the communication load is low.

If the second transition condition C2 is satisfied (S532: Yes), then in the next step S534, the power mode controller 910 (FIG. 1) changes the power mode from the second power mode to the first power mode. In the embodiment, the power mode controller 910 instructs the packet processor 100 to operate in the first power mode. The packet processor 100, in response to this instruction, stops the power supply to the part of the electronic circuitry within the packet processor 100, to stop the forwarding function. The result is that the consumption of electric power is reduced.

In the next step, S536, the power mode controller 910 (FIG. 1) updates the information indicating the current power mode to represent "first power mode."

The power mode transitions from the second power mode to the first power mode in accordance with steps S534 and S536 described above (FIG. 13: ST3). Following step S536, the process advances to step S540.

If, in step S532, the second transition condition C2 is not satisfied, then the power mode controller 910 skips steps S534 and S536 to advance to step S540. In this case, the second power mode is maintained (FIG. 13: ST4).

Note that when, in the packet processing in FIG. 10, the process goes to step S170, then the power mode controller 910 (FIG. 1) goes to step S524 in the process in FIG. 12. The result is that when the communication load increases, it is possible for the power mode controller 910 to rapidly change the power mode to the second power mode.

As described above, in the embodiment the switching device SW switches the power mode appropriately in accordance with the communication load. For example, in the operating state illustrated in FIG. 2, no packet is sent from the first switching device SW1 to the third switching device SW3. Consequently, the communication load on the third switching device SW3 will be low. The result is that the power mode of the third switching device SW3 will switch automatically to the first power mode. When in the operating state illustrated in FIG. 3, the quantity of packets sent from the first switching device SW1 to the third switching device SW3 is high. Consequently, the communication load on the third switching device SW3 is high. The result is that the third switching device SW3 will operate in the second power mode automatically.

As described above, in the embodiment, when the communication load is low, the first switching device SW1 sends packets to the part of the redundant communication paths, and the power mode of the third switching device SW3 on the other communication path is set to the first power mode (FIG. 2). The result is that it is possible to reduce the power consumption of the network system 1100. When the communication load is high, then the first switching device SW1 distributes the low priority packets LPP on the redundant communication paths, and the power mode of the third switching device SW3 is set to the second power mode (FIG. 3). The result is that it is possible to suppress problems with packet forwarding.

Note that the second switching device SW2, which is in charge of relaying the high priority packets HPP, preferably maintains the power mode at the second power mode (the active mode) regardless of the communication load. In the embodiment, the destination determination module 130 in the first switching device SW1 (FIG. 1 through FIG. 3) switches the selecting mode from the first selecting mode to the second selecting mode without waiting for the completion of the switching of the power mode in the third switching device SW3. The result is that it is possible to suppress problems with the forwarding of the high priority packets HPP that arise due to an increase in the communication load on the second switching device SW2. Furthermore, because the problems are suppressed in regards to the high priority packets HPP, it is possible to reduce the capacity of the packet buffer 112 (FIG. 1). Note that the destination determination module 130 may switch the selecting mode after the completion of the switching of the power mode instead.

In the embodiment, each packet processor 100 executes forwarding processing in accordance with the so-called priority queuing. In this forwarding processing, the processing of the high priority packets HPP is given priority. The result is that it is possible to suppress problems with the forwarding of the high priority packets HPP.

B. Second Embodiment

Figure 14:
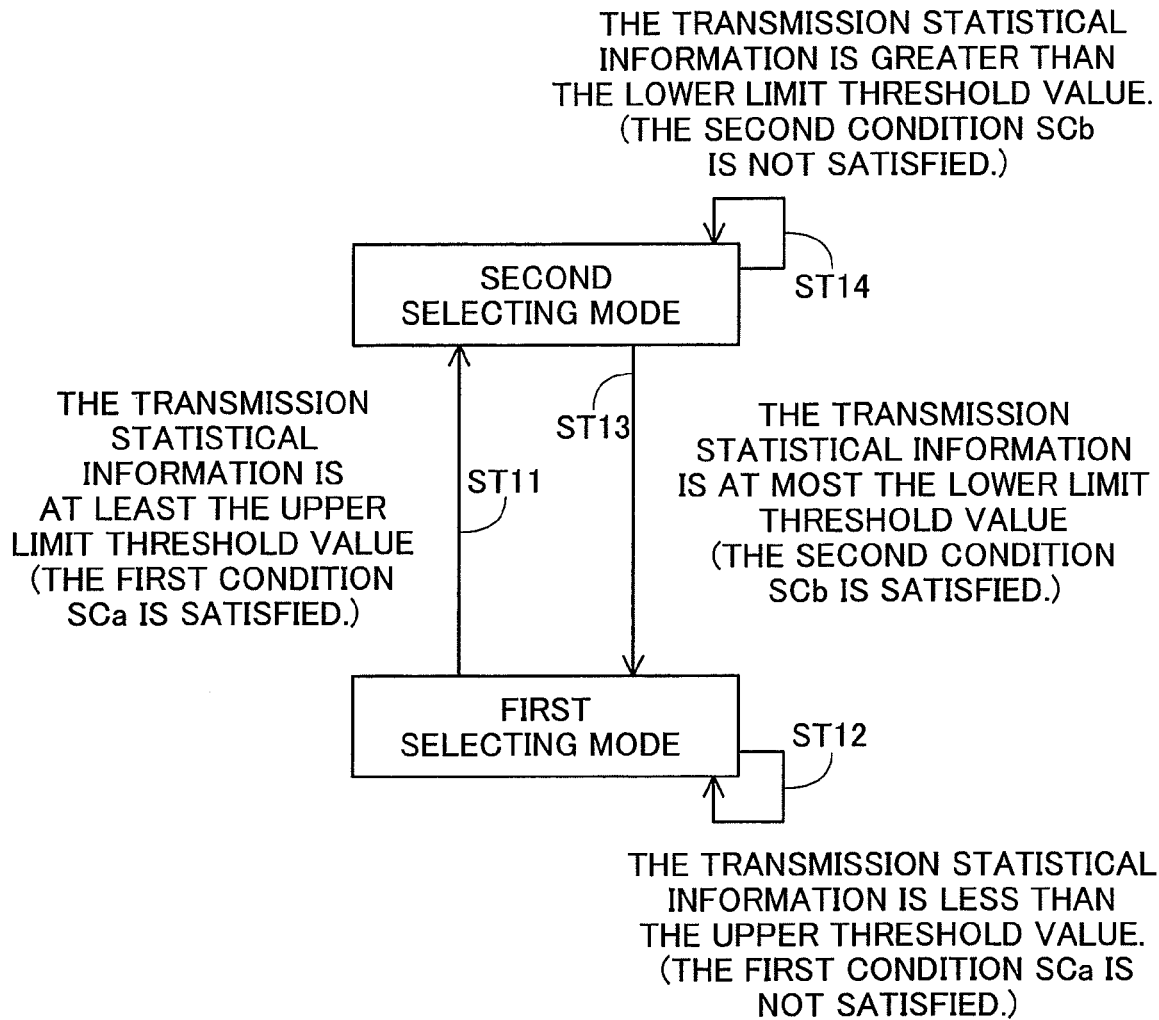
FIG. 14 is an explanatory diagram illustrating another embodiment of switching the selecting mode.

FIG. 14 is an explanatory diagram illustrating another embodiment of switching the selecting mode. In contrast to the embodiment illustrated in FIG. 11, in the embodiment, the destination determination module 130 determines the selecting mode in accordance with the two conditions SCa and SCb, illustrated below. The processes aside from the selecting mode determination (FIG. 11: S320) are the same as those in the first embodiment illustrated in FIG. 10 through FIG. 12. Furthermore, the configurations in the network system 1100 are the same as those in the first embodiment illustrated in FIG. 1.

The conditions SCa and SCb used in the embodiment are as set forth below:

(First Switching Condition SCa) The total output load on the selectable port list is greater than or equal to the selecting upper limit.

(Second Switching Condition SCb) The total output load on the selectable port list is less than or equal to the selecting lower limit.

Here the "selectable port list" is a list of physical ports P relating to the destination IP address. This list is a list of all physical ports P that can be used to communicate with the destination. This list is selected in step S300 in FIG. 11. The "total output load on the selectable port list" refers to the total value of the number of packets/sec" of the output packets for all processing priorities for all physical ports P that are included in the selectable port list. For example, the case wherein the destination is the first address DA1 in the embodiment illustrated in FIG. 6 and FIG. 8 will be described below. In this case, the "selectable port list" is the first and the second physical ports P1, P2, and the total output load is the sum of the total transmission load S1LDe and the total transmission load S2LDe (FIG. 6).

The first switching condition SCa is a condition for switching the selecting mode from the first selecting mode to the second selecting mode. The selecting upper limit is set in advance to a value that is somewhat less than the maximum value of the processing capability of the relaying device (the downstream relaying device) that is connected to the low load output port. The fact that the transmission statistical information satisfies the first switching condition SCa has the following meaning: there is a high probability that the concentration of the packet output on the low load output port could cause the communication load to exceed the processing capability on the downstream relaying device of the low load output port.

If the first switching condition SCa is satisfied, then the destination determination module 130 (FIG. 1) sets the selecting mode to the second selecting mode. If the current selecting mode is the first selecting mode, then the destination determination module 130 changes the selecting mode from the first selecting mode to the second selecting mode (FIG. 14: ST11). Consequently, as illustrated in FIG. 3, the packet output is distributed between the low load output port (P1) and the high load addition port (P2). The result is that, as with the first embodiment, problems with packet forwarding can be suppressed.

The second switching condition SCb is a condition for switching the selecting mode from the second selecting mode to the first selecting mode. The selecting lower limit is set in advance to a value smaller than the maximum value for the processing capability of the relaying device (downstream relaying device) that is connected to the low load output port. The fact that the transmission statistical information satisfies the second switching condition SCb has the following meaning: even if the packet output is concentrated on the low load output port, the communication load on the downstream relaying device of the low load output port will not exceed the processing capability thereof. Note that the selecting lower limit is preferably less than the aforementioned selecting upper limit. Doing so makes it possible to prevent excessively frequent switching of the selecting mode.

If the second switching condition SCb is satisfied, then the destination determination module 130 (FIG. 1) sets the selecting mode to the first selecting mode. If the current selecting mode is the second selecting mode, then the destination determination module 130 changes the selecting mode from the second selecting mode to the first selecting mode (FIG. 14: ST13) Consequently, as illustrated in FIG. 2, the packet output will be concentrated on the low load output port (P1). The result is that it is possible to set the power mode of the third switching device SW3 to the first power mode.

Note that if the current selecting mode is the first selecting mode and the first switching condition SCa is not satisfied, then the destination determination module 130 (FIG. 1) maintains the selecting mode in the first selecting mode (FIG. 14: ST12). If the current selecting mode is the second selecting mode and the second switching condition SCb is not satisfied, then the destination determination module 130 maintains the selecting mode in the second selecting mode (FIG. 14: ST14).

As described above, in the second embodiment, the destination determination module 130 (FIG. 1) determines the selecting mode taking into consideration the loads on all of the physical ports P that can communicate with the destination. Consequently, the destination determination module 130 is able to use the appropriate selecting mode.

C. Third Embodiment

Figure 15:
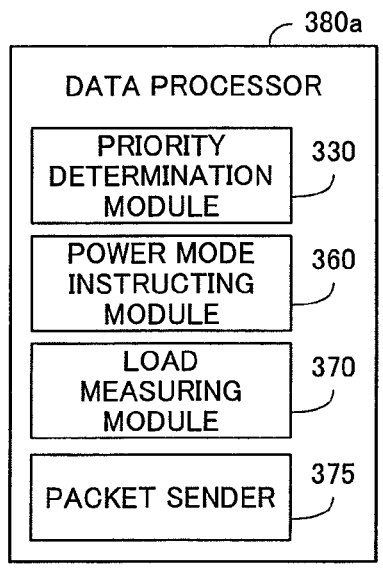
FIG. 15 is an explanatory diagram of a data processor 380a in a third embodiment.

FIG. 15 is an explanatory diagram of a data processor 380a as set forth in a third embodiment. The difference from the data processor 380 illustrated in FIG. 1 is only in the point that a power mode instructing module 360 is added. The other configurations are the same as those in the data processor 380 illustrated in FIG. 1. The configuration of the network system in the third embodiment is the same as that of the network system 1100 in FIG. 1, with the exception of the point that the data processor 380 is replaced by the data processor 380a.

Figure 16:
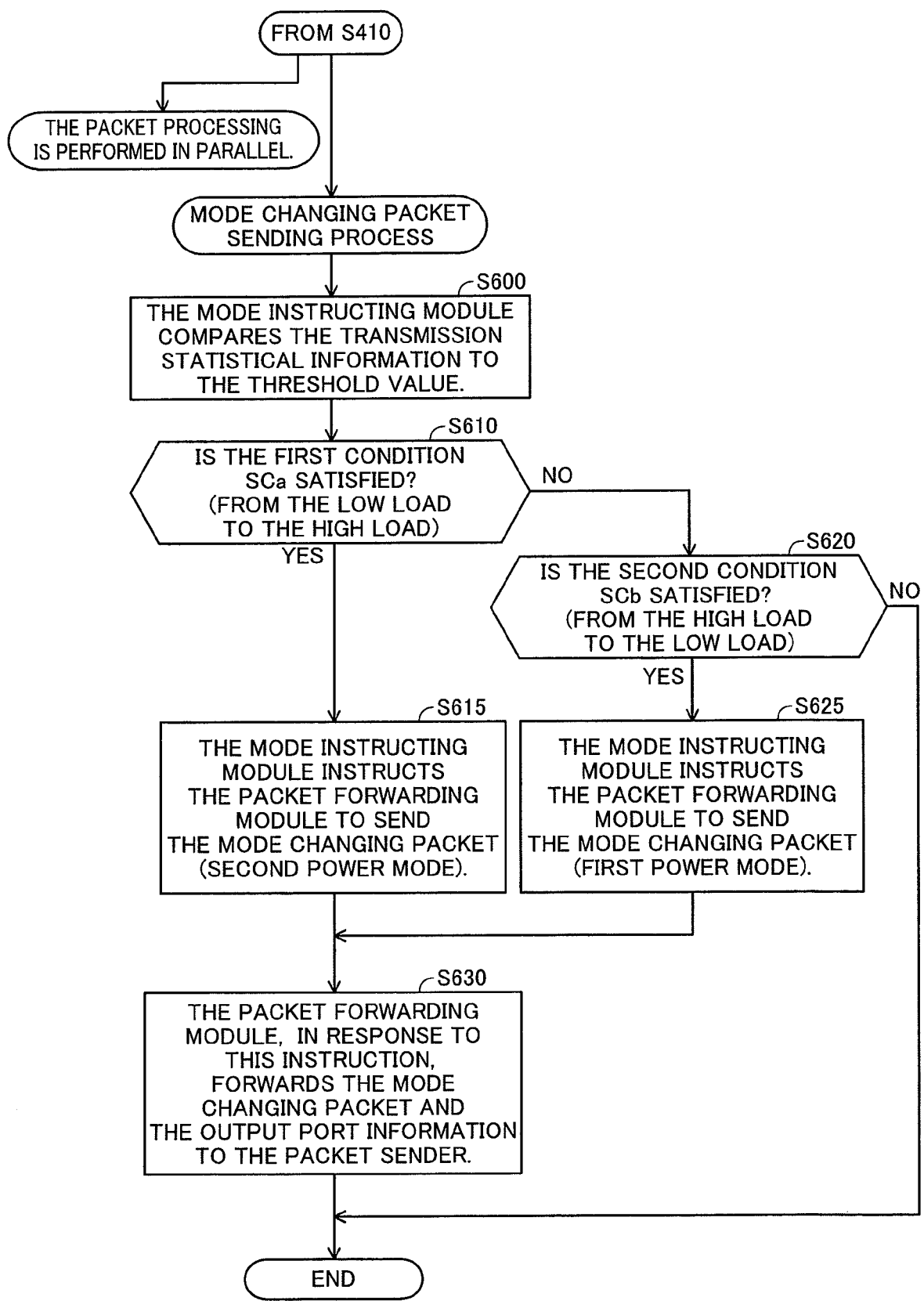
FIG. 16 is a flowchart illustrating the sequence of the mode changing packet transmission process.

In the third embodiment, the packet processing is the same as that of the second embodiment illustrated in FIG. 10, FIG. 11, and FIG. 14. Furthermore, in the third embodiment, a mode changing packet transmitting process is performed in addition to the processes in FIG. 10 and FIG. 11. FIG. 16 is a flowchart illustrating the procedure of the mode changing packet transmitting process. This process is a process that follows step S410 in FIG. 11. Note that the mode changing packet transmitting process is executed in parallel with the packet processing in FIG. 10 and FIG. 11.

In the first step, S600, the power mode instructing module 360 (FIG. 15) compares the transmission statistical information, which has been updated in step S410 in FIG. 11, to a threshold value. If the same condition as in step ST11 in FIG. 14 is satisfied (S610: Yes), then in the next step S615, the power mode instructing module 360 sends a mode changing packet to the packet forwarding module 110 (FIG. 1). The mode changing packet includes an instruction to change the power mode to the second power mode. Furthermore, the destination for the mode changing packet is a relaying device that is connected to a switching-subject output physical port (hereinafter termed "switching-subject relaying device"). The "switching-subject output physical port" refers to output physical ports that can be used in the first selecting mode but that cannot be used in the second selecting mode. For example, the "switching-subject output physical port" is the second physical port P2 in the embodiment illustrated in FIG. 3. The destination is the third switching device SW3 that is connected to the second physical port P2. That is, the mode changing packet is an instruction to the third switching device SW3 to change the power mode to the second power mode.

On the other hand, if the same condition as in step ST13 in FIG. 14 is satisfied (S620: Yes), then in the next step S625, the power mode instructing module 360 (FIG. 15) sends a mode changing packet to the packet forwarding module 110 (FIG. 1). The difference from step S615 is only in the fact that the mode changing packet includes an instruction to change the power mode to the first power mode.

Note that the instruction from the power mode instructing module 360 (FIG. 15) to the packet forwarding module 110 (FIG. 1) is performed similarly to step S180 in FIG. 10. That is, the packet forwarding module 110, in the same manner as for a normal packet, receives the mode changing packet from the power mode instructing module 360. However, the output physical port for the mode changing packet is determined in advance by the mode instructing module 360 to be the switching-subject output physical port.

Note that if neither of the conditions is satisfied in step ST11 or step ST13 in FIG. 14 (S610: No and S620: No), then the power mode instructing module 360 terminates the changing packet transmitting process. In this case, the changing packet is not sent. That is, the power mode of the relaying device that is connected to the "switching-subject output physical port" is maintained.

In step S630 following steps S615 and S625, the packet forwarding module 110 (FIG. 1) sends the mode changing packet and the output physical port information to the data processor 380a (FIG. 15) in response to that instruction. The packet sender 375 provides the mode changing packet transmitting instruction to the line interface 390. The line interface 390 sends the mode changing packet in accordance with the instruction. The processing in the switching device SW that receives the mode changing packet will be described below.

Note that the transmitting process for the mode changing packet is performed similarly to the transmitting process for a normal packet as illustrated in FIG. 11 (S380 through S430). However, the transmission statistical information updating and processing priorities may be omitted for the mode changing packet. Furthermore, the packet sender 110 preferably performs the transmission of the mode changing packet with priority regardless of whether or not one or more packet is stored in the queue (FIG. 9).

Note that the power mode instructing module 360 (FIG. 15) may send the mode changing packet in response to a change in the selecting mode by the destination determination module 130 (FIG. 1) without analyzing the transmission statistical information. Furthermore, the power mode instructing module 360 may provide the transmission instruction for the mode changing packet to the line interface 390, without passing through the packet processor 100.

Figure 17:
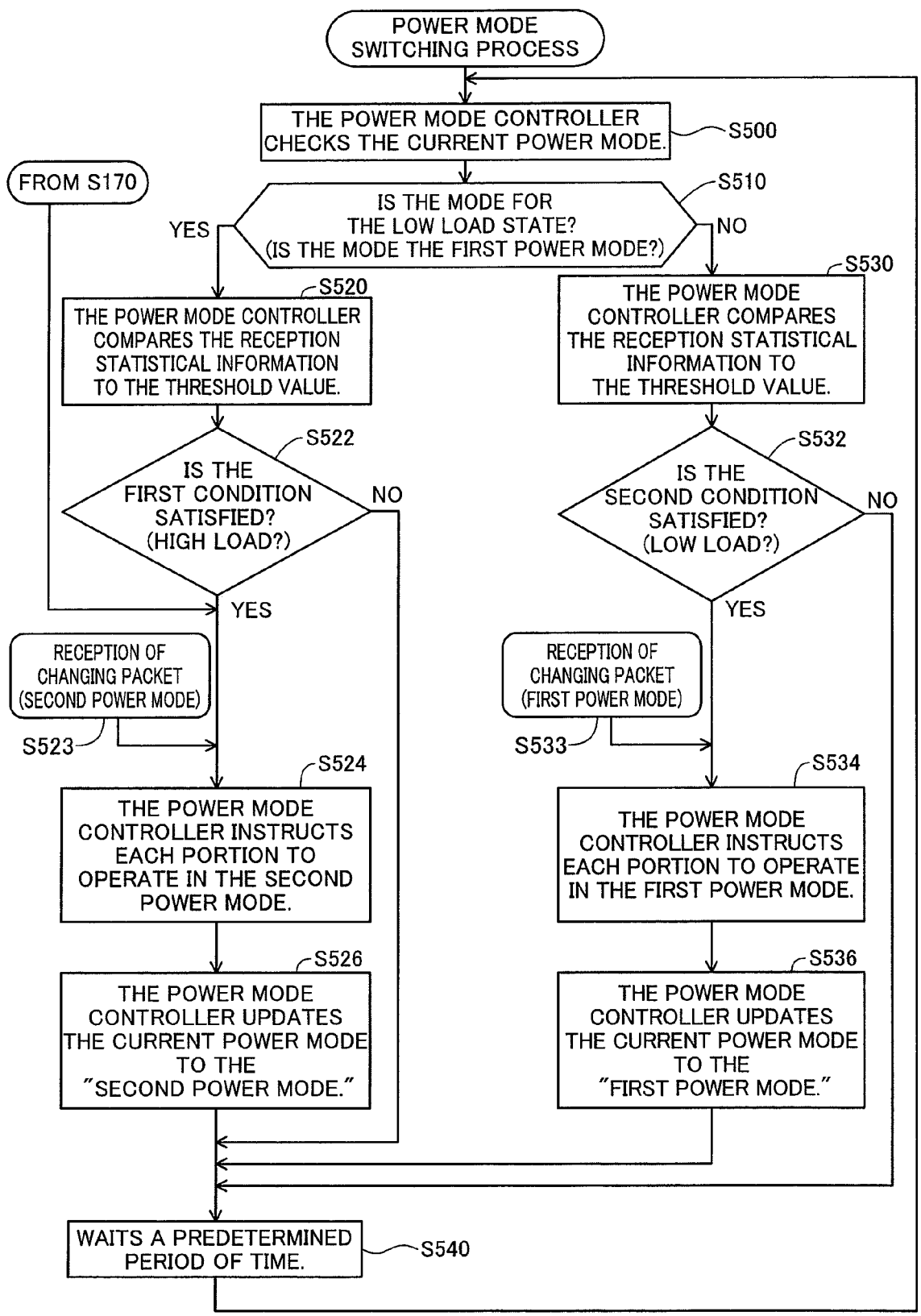
FIG. 17 is a flowchart illustrating the procedure in the power mode switching process in the third embodiment.

FIG. 17 is a flowchart illustrating the sequence of the power mode switching process in the third embodiment. The difference from the embodiment illustrated in FIG. 12 is only the point in that two interrupt processes S523 and S533 are added.

In the case wherein the mode changing packet including the instruction to change the power mode to the second power mode is received (S523), then the power mode controller 910 (FIG. 1) goes to step S524. The result is that the power mode will be switched quickly to the second power mode.

In the case wherein a mode changing packet including the instruction to change the power mode to the first power mode is received (S533), the power mode controller 910 (FIG. 1) goes to step S534. The result is that the power mode will be switched quickly to the first power mode.

Note that in the embodiment, the autonomous switching of the power mode by the power mode controller 910 (FIG. 1) may be omitted. In this case, the power mode controller 910 changes the power mode in response to the mode changing packet.

As described above, if, in the embodiment, the destination determination module 130 (FIG. 1) changes the selecting mode from the first selecting mode to the second selecting mode, then the power mode instructing module 360 (FIG. 15) sends, to the switching-subject relaying device, an instruction to change the power mode (that is, the mode changing packet). The switching-subject relaying device changes the power mode in response to that instruction. For example, if the operating state changes from the operating state in FIG. 2 to the operating state in FIG. 3, then an instruction (the mode changing packet) is sent from the first switching device SW1 to the third switching device SW3. The third switching device SW3, in response to the instruction, changes the power mode to the second power mode.

Furthermore, when the destination determination module 130 (FIG. 1) changes the selecting mode from the second selecting mode to the first selecting mode, the power mode instructing module 360 (FIG. 15) sends to the switching-subject relaying device, an instruction (the mode changing packet) to change the power mode to the first power mode. In the switching-subject relaying device changes the power mode in response to this instruction. For example, in the case wherein the operating state changes from that in FIG. 3 to that in FIG. 2, an instruction (the mode changing packet) is sent from the first switching device SW1 to the third switching device SW3. The third switching device SW3 changes the power mode to the first power mode in response to the instruction.

As described above, in the embodiment, the upstream first switching device SW1 (FIG. 1) instructs the downstream third switching device SW3 to change the power mode. Consequently, the power mode of the downstream third switching device SW3 can be set, by the upstream destination determination module 130, to a power mode that is appropriate to the selecting mode.

D. Fourth Embodiment

Figure 18A:
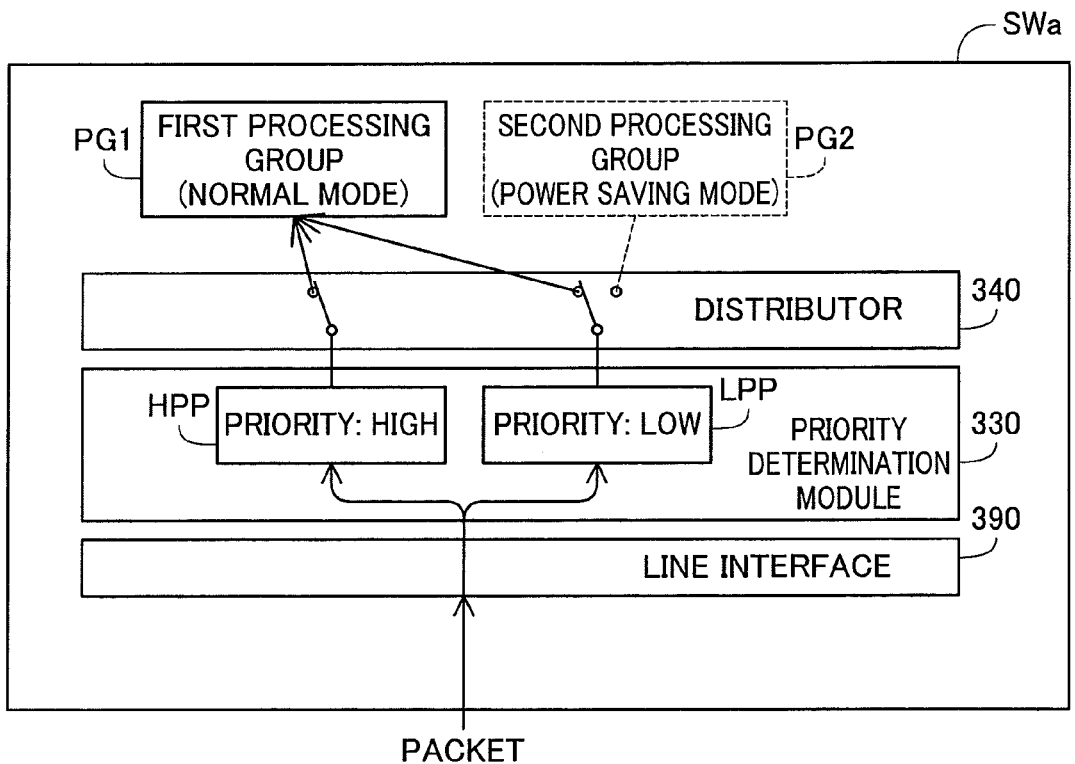
FIGS. 18A-18B are explanatory diagrams of another embodiment of a switching device.
Figure 18B:
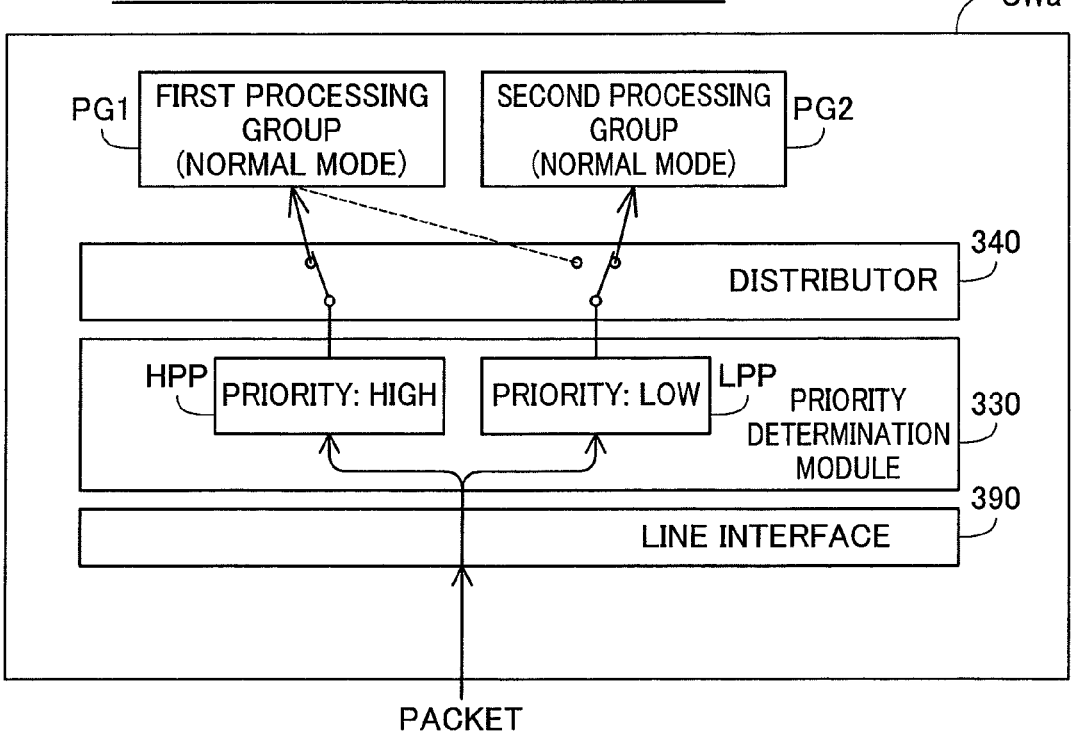

FIGS. 18A-18B are explanatory diagrams for another embodiment of a switching device. There are two points of difference from the switching device SW (for example, the first switching device SW1) illustrated in FIG. 1. The first difference is in the point that a distributor 340 is added. The second difference is in the point that there is a first process group PG1 and a second process group PG2 instead of the single packet processor 100. The other configurations are the same as those of the switching device SW in FIG. 1. Note that in FIGS. 18A-18B, elements aside from the processing groups PG1 and PG2, the distributor 340, the priority determination module 330, and the line interface 390 are omitted from the figure.

The first and second processing groups PG1 and PG2 each include one or more packet processors (not shown). The packet processors are the same as the packet processor 100 in FIG. 1. That is, in the switching device SWa, the packet forwarding process is distributed among a plurality of packet processors. The distributor 340 selects the packet processor for handling the packet with respect to each packet.

FIG. 18A illustrates the state of operation in the first power mode. The operating mode of the first processing group PG1 is the "normal mode," and the operating mode of the second processing group PG2 is the "power saving mode." In the "normal mode," the packet processor is in the operating state to control the forwarding of packets. On the other hand, in the "power saving mode," the power supply to the part of the electronic circuitry within the packet processor is stopped and the forwarding function of the packet processor is stopped. In this way, the "normal mode" has greater processing capability and greater power consumption than those of the "power saving mode."

In the first power mode, the distributor 340 selects a packet processor, from the first processing group PG1, to handle the high priority packets HPP. The distributor 340 also selects a packet processor, from the first processing group PG1, to handle the low priority packets LPP. Furthermore, the distributor 340 provides packets to these handling packet processors. The handling packet processor executes the forwarding processing for the received packet. Note that when the first processing group PG1 includes a plurality of packet processors, then the distributor 340 selects a single packet processor (the handling packet processor) in accordance with any of a variety of known methods. Either one among the following methods may be employed as the method for the selecting, for example, a method of selecting the packet processor in accordance with a hash value calculated from the packet, and a method of selecting the packet processor through a round robin method.

FIG. 18B illustrates the operating status in the second power mode. In the second power mode, the operating modes for both the first processing group PG1 and the second processing group PG2 are the "normal mode." For the high priority packets HPP, the distributor 340 selects the handling packet processor from the first processing group PG1. For the low priority packets LPP, the distributor 340 selects the handling packet processor from the second processing group PG2. The method for selecting the handling packet processor from the second processing group PG2 is the same method as used for selecting the handling packet processor from the first processing group PG1.

As described above, in the first power mode, the operating mode of the second processing group PG2 is the "power saving mode," making it possible to reduce the power consumption by the switching device SWa. Furthermore, in the second power mode, the packet forwarding process is distributed to the first processing group PG1 and the second processing group PG2, making it possible to suppress problems with packet forwarding.

Note that each of the processing groups PG1, PG2 and the distributor 340 switch the operating mode in accordance with an instruction from the power mode controller 910 (FIG. 1). Moreover, in the embodiment, both the high priority packets HPP and the low priority packets LPP may be distributed to the first processing group PG1 and the second processing group PG2.

E. Fifth Embodiment

In each of the embodiments described above, the total number of selecting modes may be three or more. For example, a third selecting mode may also be used in addition to the first and the second selecting modes described above. FIG. 19 is a schematic diagram of the third selecting mode. There are two points of difference from the second selecting mode illustrated in FIG. 3. The first difference is a point that the second physical port P2 is used as the output physical port instead of using the first physical port P1 for the low priority. The second difference is the point that, for the high priority, the first physical port P1 and the second physical port P2 are used for the output physical ports. Because, in this way, low priority packets LPP are not provided to the second switching device SW2, it is possible to suppress problems with forwarding of the high priority packets HPP in the second switching device SW2. Furthermore, because the high priority packets HPP are distributed to the second switching device SW2 and the third switching device SW3, problems with the forwarding of the high priority packets HPP can be suppressed even when the communication load for the high priority packets HPP is high.

Figure 20:
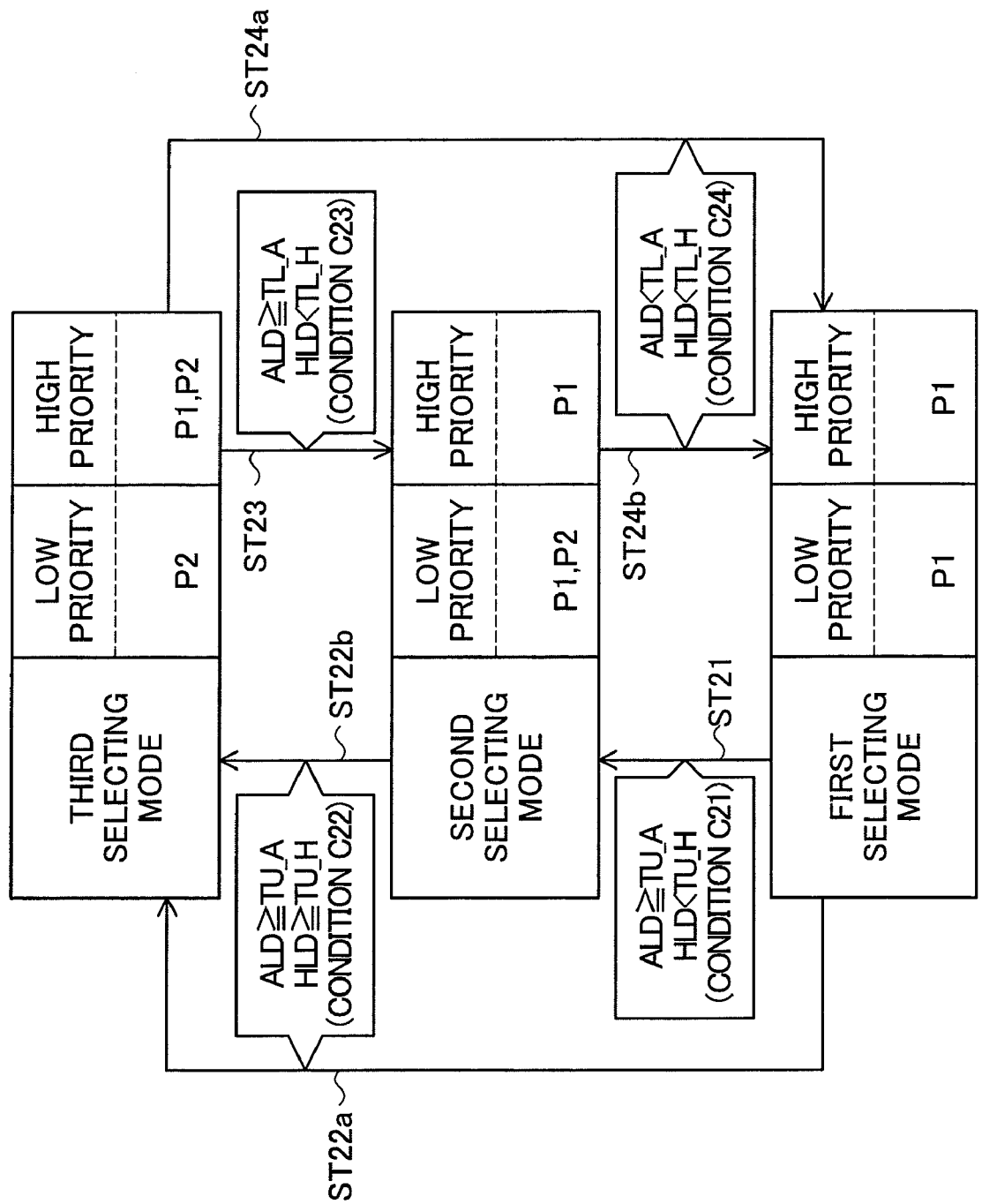
FIG. 20 is an explanatory diagram illustrating the selecting mode transitions.

FIG. 20 is an explanatory diagram illustrating the selecting mode transitions in the embodiment. The first, the second, and the third selecting modes are illustrated in FIG. 20. The output physical port candidates are illustrated for the case of the destination being the first address DA1, for each of the selecting modes. The candidates are illustrated for each processing priority.

The first condition C21, below, is a condition for switching the selecting mode from the first selecting mode to the second selecting mode (ST21).

(First condition C21) The total output load ALD for the selectable port list is greater than or equal to the upper limit TU_A, and the total output load HLD for the high priority for the selectable port list is less than the upper limit TU_H.

This condition adds the condition "HLD<TU_H" to the first switching condition SCa described above (ALD=S1LDe+S2LDe (FIG. 6).) In the case of the destination being the first address DA1, in the embodiment illustrated in FIG. 6 and FIG. 8, the output load HLD for the high priority is the total of the transmission load S1LD1 for the first physical port P1 and the transmission load S2LD1 for the second physical port P2. Furthermore, the upper limit TU_H is set in advance to a value that is smaller than the maximum value of the processing capability of the second switching device SW2 handling the high priority in the first and the second selecting modes. The additional condition indicates that the second switching device SW2 is enough to handle alone the communication load for the high priority The second condition C22, below, is the condition for switching the selecting mode from the first selecting mode to the third selecting mode (ST22a) and from the second selecting mode to the third selecting mode (ST22b).

(Second condition C22) The total output load ALD for the selectable port list is greater than or equal to the upper limit TU_A, and the total output load HLD for the high priority for the selectable port list is greater than or equal to the upper limit TU_H.

This condition adds the condition of "the output load HLD is greater than or equal to the upper limit TU_H" to the first switching condition SCa, described above. This added condition indicates that the communication load for the high priority is going to exceed the processing capability of the second switching device SW2. By switching the selecting mode to the third selecting mode in accordance with this condition C22 is possible to suppress problems in forwarding of high priority packets even when the communication load for the high priority packets is high.

The third condition C23, below, is the condition for switching the selecting mode from the third selecting mode to the second selecting mode (ST23).

(Third condition C23) The total output load ALD for the selectable port list is greater than or equal to the lower limit TL_A, and the total output load HLD for the high priority for the selectable port list is less than the lower limit TL_H.

The fact that the total output load ALD is greater than or equal to the lower limit TL_A means that the communication load is high. Furthermore, the lower limit TL_H is set in advance to a value that is smaller than the maximum value for the processing capability of the second switching device SW2 handling the high priority in the second selecting mode. The total output load HLD being less than the lower limit TL_H means that it is possible to handle the communication load for the high priority using the second switching device SW2 alone. Note that the lower limit TL_H is preferably smaller than the upper limit TU_H.

The fourth condition C24, below, is the condition for switching the selecting mode from the third selecting mode to the first selecting mode (ST24a) and from the second selecting mode to the first selecting mode (ST24b).

(Fourth condition C24) The total output load ALD for the selectable port list is less than the lower limit TL_A, and the total output load HLD for the high priority for the selectable port list is less than the lower limit TL_H.

The total output load ALD being less than the lower limit TL_A means that the communication load is low. Switching the selecting mode to the first selecting mode in accordance with the fourth condition C24 makes it possible to reduce the power consumption while suppressing problems with forwarding of high priority packets.

As described above, in the embodiment the output physical ports are expanded for the high priority packets when the load of the high priority packets is high (the third selecting mode). The result is that it is possible to suppress problems with forwarding of the high priority packets. Note that the destination determination module 130 (FIG. 1) continues the current selecting mode if none of the transition conditions illustrated in FIG. 20 are satisfied.

F. Modified Embodiments

Apart from those elements that are claimed in independent claims, elements appearing in the preceding respective embodiments are optional elements and may be omitted where appropriate. The invention is not limited to the embodiments set forth hereinabove, and may be embodied with various modifications within its scope. It can be embodied according to the following modified embodiments, for example.

Modified Embodiment 1

The total number of communication paths linking the first switching device SW1 (FIG. 2 and FIG. 3) and the destination device DD is not limited to 2, as in the various embodiments described above, but may instead be three or more. For example, a fifth switching device (not shown) may be connected between the first switching device SW1 and the network system NETB. In any case, concerning the low priority, the output port list for the first selecting mode may include any number (at least 1) of physical ports P. Similarly, the output port list for the second selecting mode may include any number (at least 1) of physical ports P. These are true for the high priority as well.

Modified Embodiment 2

The output port list in each of the embodiments described above may be determined for each individual destination. For example, the list for the second address DA2 in the destination table 132 illustrated in FIG. 8 may be modified as described below. That is, the low load port list may be set to the "second physical port P2" (for both the low priority and the high priority). Furthermore, the high load addition list may be set to the "first physical port P1" (for the low priority).

Modified Embodiment 3

A variety of configurations may be used for the configuration of each selecting mode in each of the embodiments described above. For example, in the operating state illustrated in FIG. 3, the "second physical port P2" may be used alone for the output port list for the low priority packets LPP. Furthermore, the destination determination module 130 (FIG. 1) may determine the output port list (FIG. 8) automatically. For example, the destination determination module 130 may use part of the ports included in the selectable port list as the low load list (for both the low priority and the high priority). The destination determination module 130 may use all of the selectable port list for the high load list (for the low priority).

In general, it is preferable to be able to use the first and the second selecting modes as described below. That is, in the first selecting mode, the packet processor 100 of the first relaying device selects the output port, for the relatively high first priority, from among at least one candidate port including the first port, and selects the output port, for the relatively low second priority, from among at least one candidate port excluding the second port. In the second selecting mode, the packet processor 100 selects the output port, for the first priority, from among at least one candidate port including the first port, and selects the output port, for the second priority, from among at least one candidate port including the second port. Here the second relaying device is connected to the first port, and the third relaying device is connected to the second port. The power mode of the third relaying device will change. Moreover, both of the first port and the second port can be used to communicate with a specific common destination. Here the fact that "a particular port can be used to communicate with a particular destination" means that packets sent from that particular port are able to arrive eventually at the particular destination through communication paths such as lines and relaying devices. In short, the particular port is capable of communication with the particular destination.

In the first selecting mode, the output port for the first priority may be selected from two or more candidate ports including the first port and the second port. Conversely, the output port for the first priority may be selected from at least one candidate port including the first port and excluding the second port. This is also true for the second selecting mode.

In the first selecting mode, the output port for the second priority may be selected from at least one candidate port including the first port. Conversely, the output port for the second priority may be selected from at least one candidate port excluding the first port. This is also true for the second selecting mode.

In any case, in both the first selecting mode and the second selecting mode, preferably, for the first priority, the frequency with which the first port is selected as the output port is greater than the frequency with which the second port is selected as the output port. Doing so causes that frequency to be low with which a communication path through the third relaying device (the power mode is changeable) is used for the first priority, making it possible to suppress the reduction in reliability of the relaying of packets of the first priority.

Note that a plurality of lines may couple the first relaying device and the third relaying device. Generally, the N ports of the first relaying device include L (where L is an integer at least 1) ports connected to lines from the third relaying device (hereinafter the L ports are termed "branch ports"). Here, in the first selecting mode, the packet processor 100 preferably selects a port other than the branch port as the output port. According to this configuration, the first relaying device does not send packets to the third relaying device in the first selecting mode, thus it is possible to increase the degrees of freedom of setting the power mode of the third relaying device while still suppressing problems with packet forwarding. For example, the packet relaying function of the third relaying device may be halted. Doing so can greatly reduce the power consumption.

Note that the total number of selecting modes may be three or greater. In any event, the available selecting modes preferably include the first selecting mode and the second selecting mode described above.

Modified Embodiment 4

In each of the above embodiments, there is no limitation of the selecting mode switching conditions to the conditions illustrated in FIG. 11 or the conditions illustrated in FIG. 14, but rather any conditions may be used. For example, conditions specified through user instruction may be used. Generally, it is preferable to use conditions that strongly suppress problems with packet forwarding for the relatively high processing priority packets when compared to the relatively low processing priority packets.

Modified Embodiment 5

In each of the embodiments described above, any method may be used to embody the plurality of power modes (operating modes) that have different levels of power consumption. For example, the voltage of the power supplied to the packet processor 100 may be adjusted. Furthermore, when the packet processor 100 operates synchronized to a clock signal, the frequency of that clock may be modified. Furthermore, as in the embodiment illustrated in FIGS. 18A-18B, the operating mode may be changed for part of the packet processors. The operating modes of other elements, other than the packet processor, may be changed. For example, the operating mode of the line interface (FIG. 1) may be changed. Here the operating mode of sub-circuitry associated with part of the physical ports P within the line interface 390 may be changed. In this case, the plurality of physical ports P may be divided into multiple groups, and the operating modes of the sub-circuitries associated with these groups may be switched for each of the groups respectively. Note that the relaying device may stop performing packet relaying processes in the first power mode wherein the power consumption is relatively small. Instead, the relaying device may perform packet relaying processes with a processing capability that is low when compared to that of the second power mode.

Modified Embodiment 6

The total number of available power modes in each of the embodiments set forth above may be three or more. In any case, the available power modes preferably include the first power mode (low power consumption) used when the selecting mode is the first selecting mode, and the second power mode (high power consumption) used when the selecting mode is the second selecting mode.

Modified Embodiment 7

In each of the embodiments set forth above, not only the conditions illustrated in FIG. 10 and the conditions illustrated in FIG. 12, various conditions may be used as the conditions used by the power mode controller 910 (FIG. 1) in order to switch the power mode in accordance with the communication load. Here, the condition for using the first power mode (low power consumption) preferably includes that the generalized reception load (described later) is less than a predetermined lower threshold value. The condition for using the second power mode (high power consumption) preferably includes that the generalized reception load is greater than or equal to a predetermined upper limit value. According to this configuration, the power mode controller 910 is able to set the power mode appropriately for the communication load.

Here the generalized reception load indicates a value obtained by generalize the reception communication loads of all of the ports of the relaying devices to which the power mode controller 910 (FIG. 1) belongs. For example, the power mode controller 910 of the first switching device SW1 determines the generalized reception load by generalizing the reception communication loads of all of the physical ports P of the first switching device SW1. A variety of values may be used as the generalized reception load; for example, the total value for the reception communication loads for all of the ports, or the total value obtained through providing weightings for the reception communication loads for each of ports may be used. Additionally, maximum value or average value, or weighted average value, obtained from the reception communication loads for all of the ports, may be used. Note that the reception communication loads need not be limited to the number of received packets per unit time, but various values representing magnitude of the communication loads may be employed. For example, the amount of reception data per unit time may be used. Conversely, a value that is obtained through combining the number of received packets and the amount of received data may be used.

Here the upper limit value may be the same as the lower limit value. However, the upper limit value is preferably greater than the lower limit value. Doing so makes it possible to prevent excessively high frequencies in the switching of the power modes. In this case, the power mode controller 910 (FIG. 1) may select the power mode in accordance with other additional conditions, under the condition that the generalized reception load is within a range that is at least the lower limit value and less than the upper limit value. For example, hysteresis may be built into the mode switching conditions, as in the embodiment illustrated in FIG. 12. Furthermore, when the total number of available power modes is three or more, then the power mode controller 910 preferably selects the power mode in accordance with other conditions in addition to the conditions based on the generalized reception load. For example, if other predetermined conditions are satisfied, then even if the generalized reception load is greater than the upper limit value, the power mode controller 910 may select a third power mode that is different from both the first power mode and the second power mode. In any event, if the generalized reception load is greater than the upper limit value, preferably the first power mode will not be selected. Furthermore, if the generalized reception load is less than the lower limit value, then preferably the second power mode will not be selected.

Modified Embodiment 8

In each of the embodiments set forth above, any information included in the packet header information may be used as the information used for determining the processing priority. For example, the priority determination module 330 (FIG. 1) may determine the processing priority in accordance with the layer 4 destination port number (FIGS. 4F-4G). Furthermore, the priority determination module 330 may determine the processing priority in accordance with other information, not limited to the header information. For example, the priority determination module 330 may determine the processing priority in accordance with an identifier for the physical port P that has received the packet. In any event, the priority determination module 330 may determine the processing priority in accordance with conditions specified by the user. Furthermore, the total number of processing priorities may be any number at least 2. Here the aforementioned first priority may be lower than the highest priority. Furthermore, the aforementioned second priority may be higher than the lowest priority. In any event, the output port list may be set in advance for each priority.

Modified Embodiment 9

In each of the embodiments set forth above, not only the configuration illustrated in FIG. 1, various configurations may be employed as the configuration of the network system 1100. For example, instead of the fourth switching device SW4, a data providing device, such as a server, may be connected to the first switching device SW1. The technologies in each of the embodiments set forth above may be applied to, in general, a network system that includes a first switching device SW1, a second switching device SW connected to the first switching device SW1, and a third switching device SW3 connected to the first switching device SW1.

Modified Embodiment 10

In each of the embodiments set forth above, not only the configurations illustrated in FIG. 1 and FIGS. 18A-18B, various configurations may be employed as the configuration of the switching devices SW. For example, the line interface 390 may be divided into a plurality of sub-circuitries. The configurations of each of the switching devices SW1 through SW4 may be different from each other. For example, the power mode controller 910 may be omitted from the first switching device SW1. Furthermore, a switching device that operates without using the processing priority may be used as the third switching device SW3. Furthermore, a known switching device may be used as the second switching device SW2.

Furthermore, in each of the embodiments as set forth above, not only the so-called layer 3 switches, various relaying devices relaying the packets may be used as the relaying device. For example, a so-called layer 2 switch may be used, or a so-called router may be used.

Furthermore, in each of the embodiments as set forth above, not only the so-called layer 3 multi paths, various paths or routes may be employed as the redundant communication paths. For example, redundant communication paths may be configured through the link aggregation technology. For example, in the embodiment illustrated in FIG. 3, the physical line Pt1 between the switching devices SW1 and SW2 and the physical line Pt2 between the switching devices SW1 and SW3 may be used as a single logical line configured by the link aggregation technology.

Modified Embodiment 11

In each of the embodiments set forth above, any method may be used as the method for controlling the forwarding of the received packets by giving priority to the first priority over the second priority. For example, the weighted queuing method (also known as "custom queuing") may be used. Other types of queuing methods may also be used. The total number of types of queues is not limited to 2, but any number of types of queues may be used. Here the number of processing priorities may be different from the number of types of queues.

Modified Embodiment 12

In the preceding respective embodiments, some elements implemented through hardware could instead be implemented through software, and conversely some or all of the elements implemented through software could instead be implemented through hardware. For example, the function of the packet processor 100 in FIG. 1 may be embodied in a computer which executes a program.

Where part or all of the functions of the invention are implemented through software, the software (computer program) for this purpose may be provided in a form stored on a computer-readable recording medium. In the invention, "computer-readable recording medium" is not limited to portable recording media such as flexible disks or CD-ROM, but also includes internal memory devices in a computer such as various types of RAM and ROM, as well as external storage devices attached to a computer, such as a hard disk.

Modified Embodiment 13

While various aspects of the invention are shown herein, there are other possible aspects such as the following.

Aspect 2. The network system according to the first aspect, wherein
a selection frequency of the first port as the output port is greater than a selection frequency of the second port as the output port, for a received packet of the first priority, in the first selecting mode and in the second selecting mode.

With this arrangement, the frequency of use of the communication path through the third relaying device (the power mode is changeable) is low for the first priority, making it possible to suppress reductions in the reliability of relay of packets of the first priority.

Aspect 3. The network system according to any one among aspects 1-2, wherein
the power mode controller:
sets the power mode to the first power mode under a first power mode condition indicating that a communication load is relatively low; and
sets the power mode to the second power mode under a second power mode condition indicating that the communication load is relatively high.

This arrangement enables the power mode controller in the third relaying device to set the power mode appropriately in accordance with the communication load.

Aspect 4. The network system according to any one among aspects 1-3, wherein
the first relaying device further comprises a power mode instructing module, wherein
the power mode instructing module:
sends, in a case where the selecting mode changes to the first selecting mode, to the third relaying device an instruction to set the power mode to the first power mode; and
sends, in a case where the selecting mode changes to the second selecting mode, to the third relaying device an instruction to set the power mode to the second power mode,
the power mode controller of the third relaying device sets the power mode in accordance with the instruction.

This arrangement enables the power mode in the third relaying device to be set to a power mode suitable for the selecting mode in the packet processor.

Aspect 5. The network system according to any one among aspects 1-4, wherein:
in the first selecting mode, the packet processor:
selects, from at least one candidate port including the first port and excluding the second port, the output port to be used for the received packet of the first priority; and
selects, from at least one candidate port including the first port and excluding the second port, the output port to be used for the received packet of the second priority, wherein
in the second selecting mode, the packet processor:
selects, from at least one candidate port including the first port and excluding the second port, the output port to be used for the received packet of the first priority; and
selects, from at least one candidate port including the second port, the output port to be used for the received packet of the second priority.

According to this arrangement, for the first priority, the use of the communication path passing through the third relaying device whose power mode is changeable is prevented, thus the reduction in the reliability of the relaying of packets of the first priority can be suppressed.

Aspect 6. The network system according to any one among aspects 1-5, wherein
the N ports include L (the number L is an integer at least 1) branch ports, the L branch ports being ports connected to lines from the third relaying device, the L branch ports including the second port, and
the packet processor, in the first selecting mode, selects a port other than the branch port as the output port.

With this arrangement, the first relaying device does not send packets to the third relaying device in the first selecting mode, enabling both a suppression of problems with packet forwarding and enabling increase of degree of freedom to set the power mode in the third relaying device.

Aspect 7. The network system according to aspect 3, wherein:
the first power mode condition includes that a generalized reception load is less than a predetermined lower limit value, the generalized reception load being obtained by generalize the reception load on all ports of the third relaying device; and
the second power mode condition includes that the generalized reception load is at least a predetermined upper limit value.

With this arrangement, the power mode controller can set the power mode appropriately in accordance with the communication load.

Aspect 8. A relaying device for relaying a packet, comprising:
N (the number N is an integer at least 2) ports configured to connect to lines
a priority determination module that determines a priority of a received packet from among K (the number K is an integer at least 2) priority levels including a first priority and a second priority; and
a packet processor that determines an output port to be used for sending the received packet; and
a power mode controller that controls a power mode of the relaying device, wherein
the power mode controller selects the power mode from among a plurality of power modes including a first power mode and a second power mode, a power consumption of the relaying device being relatively small in the first power mode, the power consumption being relatively large in the second power mode,
the packet processor determines, for each target packet, an output port to be used for sending the target packet from among J (the number J is an integer at least 2 and at most N) candidate ports among the N ports in accordance with the priority, the target packet being a received packet destined for a specific destination, in a case where:
a first external relaying device is connected to a first port among the N ports, the first external relaying device being another relaying device;
a second external relaying device is connected to a second port among the N ports, the second external relaying device being another relaying device; and
the J candidate ports are capable of communication with the common specific destination, the J candidate ports including the first port and the second port, wherein
the second external relaying device comprises a same power mode controller as the relaying device,
the packet processor has a first selecting mode and a second selecting mode for selecting the output port, the first selecting mode relating to a case where the power mode of the second external relaying device is the first power mode, the second selecting mode relating to a case where the power mode of the second external relaying device is the second power mode, wherein in the first selecting mode, the packet processor:
selects, from at least one candidate port including the first port, an output port to be used for a received packet of the first priority; and
selects, from at least one candidate port excluding the second port, an output port to be used for a received packet of the second priority, wherein
in the second selecting mode, the packet processor:
selects, from at least one candidate port including the first port, an output port to be used for a received packet of the first priority; and
selects, from at least one candidate port including the second port, an output port to be used for a received packet of the second priority.

Aspect 9. The relaying device according to aspect 8, wherein
a selection frequency of the first port as the output port is greater than a selection frequency of the second port as the output port, for a received packet of the first priority, in the first selecting mode and in the second selecting mode.

Aspect 10. The relaying device according to any one among aspects 8-9, wherein
the power mode controller:
sets the power mode to the first power mode under a first power mode condition indicating that a communication load is relatively low; and
sets the power mode to the second power mode under a second power mode condition indicating that the communication load is relatively high.

Aspect 11. The relaying device according to any one among aspects 8-10, further comprising:
a power mode instructing module, wherein
the power mode instructing module:
sends, in a case where the selecting mode changes to the first selecting mode, to the power mode controller of the second external relaying device an instruction to set the power mode to the first power mode; and
sends, in a case where the selecting mode changes to the second selecting mode, to the power mode controller of the second external relaying device an instruction to set the power mode to the second power mode.

Aspect 12. The relaying device according to any one among aspects 8-11, wherein
in the first selecting mode, the packet processor:
selects, from at least one candidate port including the first port and excluding the second port, the output port to be used for the received packet of the first priority; and
selects, from at least one candidate port including the first port and excluding the second port, the output port to be used for the received
packet of the second priority, wherein
in the second selecting mode, the packet processor:
selects, from at least one candidate port including the first port and excluding the second port, the output port to be used for the received packet of the first priority; and
selects, from at least one candidate port including the second port, the output port to be used for the received packet of the second priority.

Aspect 13. The relaying device according to any one among aspects 8-12, wherein
the N ports include L (the number L is an integer at least 1) branch ports, the L branch ports being ports connected to lines from the second external relaying device, the L branch ports including the second port, and
the packet processor, in the first selecting mode, selects a port other than the branch port as the output port.

Aspect 14. The relaying device according to aspect 10, wherein
the first power mode condition includes that a generalized reception load is less than a predetermined lower limit value, the generalized reception load being obtained by generalize the reception load on all ports of the relaying device including the power mode controller of interest; and
the second power mode condition includes that the generalized reception load is at least a predetermined upper limit value.

Aspect 15. A method of controlling a network system, wherein:
the network system comprises a first, a second, and a third relaying devices that relay packets; wherein
the first relaying device includes N (the number N is an integer at least 2) ports configured to connect to lines, the N ports including a first port and a second port, the first port being connected to a line from the second relaying device, the second port being connected to a line from the third relaying device, wherein
among the N ports, J (the number J is an integer at least 2 and at most N) candidate ports are capable of communication with a specific common destination, the J candidate ports including the first port and the second port, wherein
the third relaying device is configured to select a power mode of the third relaying device from among a plurality of power modes including a first power mode and a second power mode, a power consumption of the third relaying device being relatively small in the first power mode, the power consumption being relatively large in the second power mode, wherein
the method comprises:
determining a priority using the first relaying device, for each target packet, from among K (the number K is an integer at least 2) priority levels including a first priority and a second priority, the target packet being a received packet destined for the specific destination;
specifying a single selecting mode to be used, using the first relaying device, from a plurality of selecting modes including a first selecting mode and a second selecting mode, the first selecting mode relating to a case where the power mode of the third relaying device is the first power mode, the second selecting mode relating to a case where the power mode of the third relaying device is the second power mode; and
selecting, for each of the target packets, an output port to be used for sending the target packet from among the J candidate ports in accordance with the priority and the specified selecting mode, using the first relaying device, wherein
the selecting of the output port in accordance with the first selecting mode includes:
selecting, from at least one candidate port including the first port, an output port to be used for a received packet of the first priority, using the first relaying device; and
selecting, from at least one candidate port excluding the second port, an output port to be used for a received packet of the second priority, using the first relaying device, wherein
the selecting of the output port in accordance with the second selecting mode includes:
selecting, from at least one candidate port including the first port, an output port to be used for a received packet of the first priority, using the first relaying device; and selecting, from at least one candidate port including the second port, an output port to be used for a received packet of the second priority, using the first relaying device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A network system comprising:
a first, a second, and a third relaying devices that relay packets; wherein
the first relaying device includes N (the number N is an integer at least 2) ports configured to connect to lines, the N ports including a first port and a second port, the first port being connected to a line from the second relaying device, the second port being connected to a line from the third relaying device, wherein
among the N ports, J (the number J is an integer at least 2 and at most N) candidate ports are capable of communication with a specific common destination, the J candidate ports including the first port and the second port, wherein
the first relaying device further comprises:
a priority determination module that determines a priority of a received packet from among K (the number K is an integer at least 2) priority levels including a first priority and a second priority; and
a packet processor that determines, for each target packet, an output port to be used for sending the target packet from among the J candidate ports in accordance with the priority, the target packet being a received packet destined for the specific destination, wherein
the third relaying device comprises a power mode controller that controls a power mode of the third relaying device,
the power mode controller selects the power mode from among a plurality of power modes including a first power mode and a second power mode, a power consumption of the third relaying device being relatively small in the first power mode, the power consumption being relatively large in the second power mode,
the packet processor has a first selecting mode and a second selecting mode for selecting the output port, the first selecting mode relating to a case where the power mode of the third relaying device is the first power mode, the second selecting mode relating to a case where the power mode of the third relaying device is the second power mode, wherein
in the first selecting mode, the packet processor:
selects, from at least one candidate port including the first port, an output port to be used for a received packet of the first priority; and
selects, from at least one candidate port excluding the second port, an output port to be used for a received packet of the second priority, wherein
in the second selecting mode, the packet processor:
selects, from at least one candidate port including the first port, an output port to be used for a received packet of the first priority; and
selects, from at least one candidate port including the second port, an output port to be used for a received packet of the second priority.

2. The network system according to claim 1, wherein
a selection frequency of the first port as the output port is greater than a selection frequency of the second port as the output port, for a received packet of the first priority, in the first selecting mode and in the second selecting mode.

3. The network system according to claim 1, wherein
the power mode controller:
sets the power mode to the first power mode under a first power mode condition indicating that a communication load is relatively low; and
sets the power mode to the second power mode under a second power mode condition indicating that the communication load is relatively high.

4. The network system according to claim 1, wherein
the first relaying device further comprises a power mode instructing module, wherein
the power mode instructing module:
sends, in a case where the selecting mode changes to the first selecting mode, to the third relaying device an instruction to set the power mode to the first power mode; and
sends, in a case where the selecting mode changes to the second selecting mode, to the third relaying device an instruction to set the power mode to the second power mode,
the power mode controller of the third relaying device sets the power mode in accordance with the instruction.

5. The network system according to claim 1, wherein:
in the first selecting mode, the packet processor:
selects, from at least one candidate port including the first port and excluding the second port, the output port to be used for the received packet of the first priority; and
selects, from at least one candidate port including the first port and excluding the second port, the output port to be used for the received packet of the second priority, wherein
in the second selecting mode, the packet processor:
selects, from at least one candidate port including the first port and excluding the second port, the output port to be used for the received packet of the first priority; and
selects, from at least one candidate port including the second port, the output port to be used for the received packet of the second priority.

6. The network system according to claim 1, wherein
the N ports include L (the number L is an integer at least 1) branch ports, the L branch ports being ports connected to lines from the third relaying device, the L branch ports including the second port, and
the packet processor, in the first selecting mode, selects a port other than the branch port as the output port.

7. The network system according to claim 3, wherein:
the first power mode condition includes that a generalized reception load is less than a predetermined lower limit value, the generalized reception load being obtained by generalize the reception load on all ports of the third relaying device; and
the second power mode condition includes that the generalized reception load is at least a predetermined upper limit value.

8. A relaying device for relaying a packet, comprising:
N (the number N is an integer at least 2) ports configured to connect to lines a priority determination module that determines a priority of a received packet from among K (the number K is an integer at least 2) priority levels including a first priority and a second priority; and a packet processor that determines an output port to be used for sending the received packet; and a power mode controller that controls a power mode of the relaying device, wherein the power mode controller selects the power mode from among a plurality of power modes including a first power mode and a second power mode, a power consumption of the relaying device being relatively small in the first power mode, the power consumption being relatively large in the second power mode, the packet processor determines, for each target packet, an output port to be used for sending the target packet from among J (the number J is an integer at least 2 and at most N) candidate ports among the N ports in accordance with the priority, the target packet being a received packet destined for a specific destination, in a case where:
- a first external relaying device is connected to a first port among the N ports, the first external relaying device being another relaying device;
- a second external relaying device is connected to a second port among the N ports, the second external relaying device being another relaying device; and
- the J candidate ports are capable of communication with the common specific destination, the J candidate ports including the first port and the second port, wherein the second external relaying device comprises a same power mode controller as the relaying device, the packet processor has a first selecting mode and a second selecting mode for selecting the output port, the first selecting mode relating to a case where the power mode of the second external relaying device is the first power mode, the second selecting mode relating to a case where the power mode of the second external relaying device is the second power mode, wherein in the first selecting mode, the packet processor:
- selects, from at least one candidate port including the first port, an output port to be used for a received packet of the first priority; and
- selects, from at least one candidate port excluding the second port, an output port to be used for a received packet of the second priority, wherein in the second selecting mode, the packet processor:
- selects, from at least one candidate port including the first port, an output port to be used for a received packet of the first priority; and
- selects, from at least one candidate port including the second port, an output port to be used for a received packet of the second priority.

9. The relaying device according to claim 8, wherein a selection frequency of the first port as the output port is greater than a selection frequency of the second port as the output port, for a received packet of the first priority, in the first selecting mode and in the second selecting mode.

10. The relaying device according to claim 8, wherein the power mode controller:
- sets the power mode to the first power mode under a first power mode condition indicating that a communication load is relatively low; and
- sets the power mode to the second power mode under a second power mode condition indicating that the communication load is relatively high.

11. The relaying device according to claim 8, further comprising:
a power mode instructing module, wherein
the power mode instructing module:
- sends, in a case where the selecting mode changes to the first selecting mode, to the power mode controller of the second external relaying device an instruction to set the power mode to the first power mode; and
- sends, in a case where the selecting mode changes to the second selecting mode, to the power mode controller of the second external relaying device an instruction to set the power mode to the second power mode.

12. The relaying device according to claim 8, wherein in the first selecting mode, the packet processor:
- selects, from at least one candidate port including the first port and excluding the second port, the output port to be used for the received packet of the first priority; and
- selects, from at least one candidate port including the first port and excluding the second port, the output port to be used for the received packet of the second priority, wherein in the second selecting mode, the packet processor:
- selects, from at least one candidate port including the first port and excluding the second port, the output port to be used for the received packet of the first priority; and
- selects, from at least one candidate port including the second port, the output port to be used for the received packet of the second priority.

13. The relaying device according to claim 8, wherein the N ports include L (the number L is an integer at least 1) branch ports, the L branch ports being ports connected to lines from the second external relaying device, the L branch ports including the second port, and the packet processor, in the first selecting mode, selects a port other than the branch port as the output port.

14. The relaying device according to claim 10, wherein the first power mode condition includes that a generalized reception load is less than a predetermined lower limit value, the generalized reception load being obtained by generalize the reception load on all ports of the relaying device including the power mode controller of interest; and the second power mode condition includes that the generalized reception load is at least a predetermined upper limit value.

15. A method of controlling a network system, wherein:
the network system comprises a first, a second, and a third relaying devices that relay packets; wherein
the first relaying device includes N (the number N is an integer at least 2) ports configured to connect to lines, the N ports including a first port and a second port, the first port being connected to a line from the second relaying device, the second port being connected to a line from the third relaying device, wherein among the N ports, J (the number J is an integer at least 2 and at most N) candidate ports are capable of communication with a specific common destination, the J candidate ports including the first port and the second port, wherein the third relaying device is configured to select a power mode of the third relaying device from among a plurality of power modes including a first power mode and a second power mode, a power consumption of the third relaying device being relatively small in the first power mode, the power consumption being relatively large in the second power mode, wherein the method comprises:

determining a priority using the first relaying device, for each target packet, from among K (the number K is an integer at least 2) priority levels including a first priority and a second priority, the target packet being a received packet destined for the specific destination;

specifying a single selecting mode to be used, using the first relaying device, from a plurality of selecting modes including a first selecting mode and a second selecting mode, the first selecting mode relating to a case where the power mode of the third relaying device is the first power mode, the second selecting mode relating to a case where the power mode of the third relaying device is the second power mode; and selecting, for each of the target packets, an output port to be used for sending the target packet from among the J candidate ports in accordance with the priority and the specified selecting mode, using the first relaying device, wherein the selecting of the output port in accordance with the first selecting mode includes:

selecting, from at least one candidate port including the first port, an output port to be used for a received packet of the first priority, using the first relaying device; and selecting, from at least one candidate port excluding the second port, an output port to be used for a received packet of the second priority, using the first relaying device, wherein the selecting of the output port in accordance with the second selecting mode includes:

selecting, from at least one candidate port including the first port, an output port to be used for a received packet of the first priority, using the first relaying device; and selecting, from at least one candidate port including the second port, an output port to be used for a received packet of the second priority, using the first relaying device.

* * * * *